(12) United States Patent
Urata

(10) Patent No.: US 7,362,962 B2
(45) Date of Patent: Apr. 22, 2008

(54) INFORMATION-RECORDING APPARATUS, INFORMATION-RECORDING METHOD, INFORMATION-REPRODUCING APPARATUS, INFORMATION-REPRODUCING METHOD, AND INFORMATION-RECORDING MEDIUM

(75) Inventor: Kaoru Urata, Kanagawa (JP)

(73) Assignee: Sony Corporation (JP)

( * ) Notice: Subject to any disclaimer, the term of this patent is extended or adjusted under 35 U.S.C. 154(b) by 857 days.

(21) Appl. No.: 10/810,716

(22) Filed: Mar. 29, 2004

(65) Prior Publication Data

US 2004/0234235 A1 Nov. 25, 2004

(30) Foreign Application Priority Data

Apr. 4, 2003 (JP) .......................... P2003-101299

(51) Int. Cl.
H04N 5/00 (2006.01)
H04N 7/00 (2006.01)
H04N 7/26 (2006.01)

(52) U.S. Cl. ..................................... 386/117; 124/107

(58) Field of Classification Search ................. 386/40, 386/46, 125, 52, 107, 117, 38, 124
See application file for complete search history.

(56) References Cited

U.S. PATENT DOCUMENTS 5,510,831 A * 4/1996 Mayhew ....................... 348/47
2002/0001472 A1* 1/2002 Ohmura et al. ............. 396/429

FOREIGN PATENT DOCUMENTS

JP 05-111057 4/1993
JP 09-163408 6/1997

OTHER PUBLICATIONS

Japanese Search Report; Application No: 2003-101299; Dated: Jun. 13, 2006.

* cited by examiner

Primary Examiner—Robert Chevalier
(74) Attorney, Agent, or Firm—Rader Fishman & Grauer PLLC; Ronald P. Kananen

(57) ABSTRACT

In an information-recording apparatus and the like according to the present invention, the recording apparatus records in a magnetic tape digital information on the left and right frames for three-dimensional display. The digital information is acquired by shooting an object from the left and right at the same time. The recording apparatus comprises a recorder for recording in the magnetic tape the digital information for three-dimensional display with the digital information being alternately arranged in the left and right frames at a speed which is "n" times as high as the speed of recording digital information on one frame for normal display and in units of an error correction configuration and an information recording format, which correspond to the digital information on one frame for the normal display.

13 Claims, 14 Drawing Sheets

F I G. 1
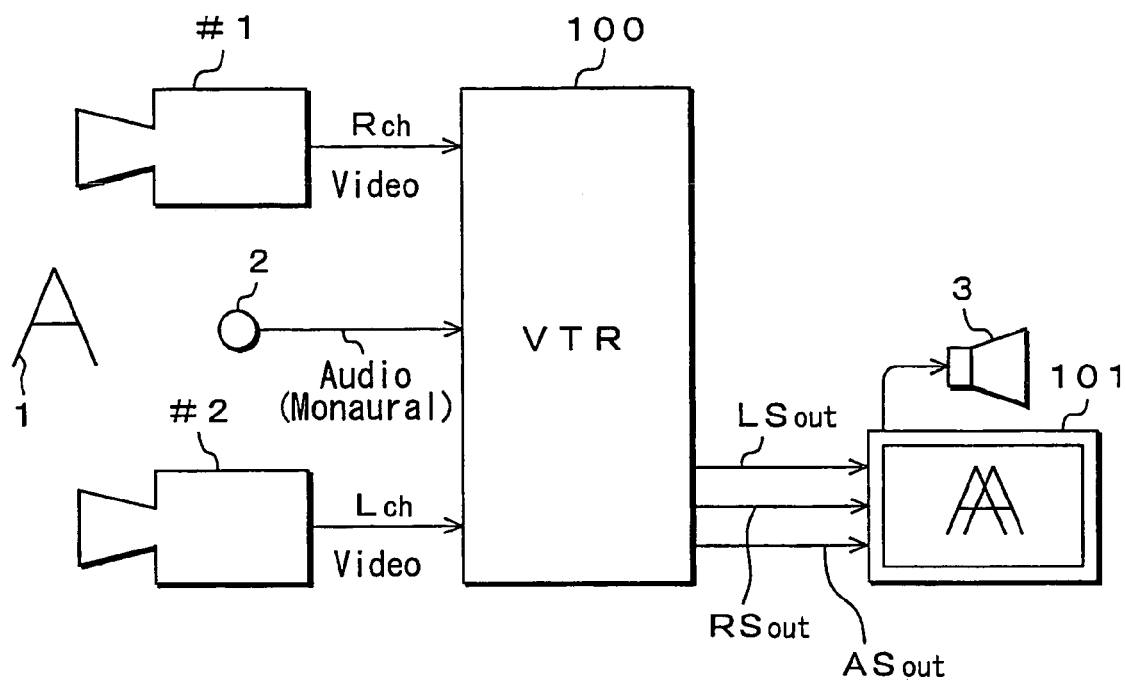
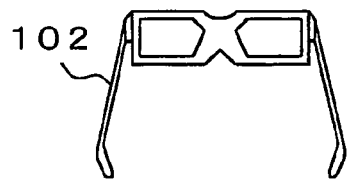
THREE-DIMENSIONAL VIEWING IS POSSIBLE

50 : RECA~RECH    55 : PBA~PBH

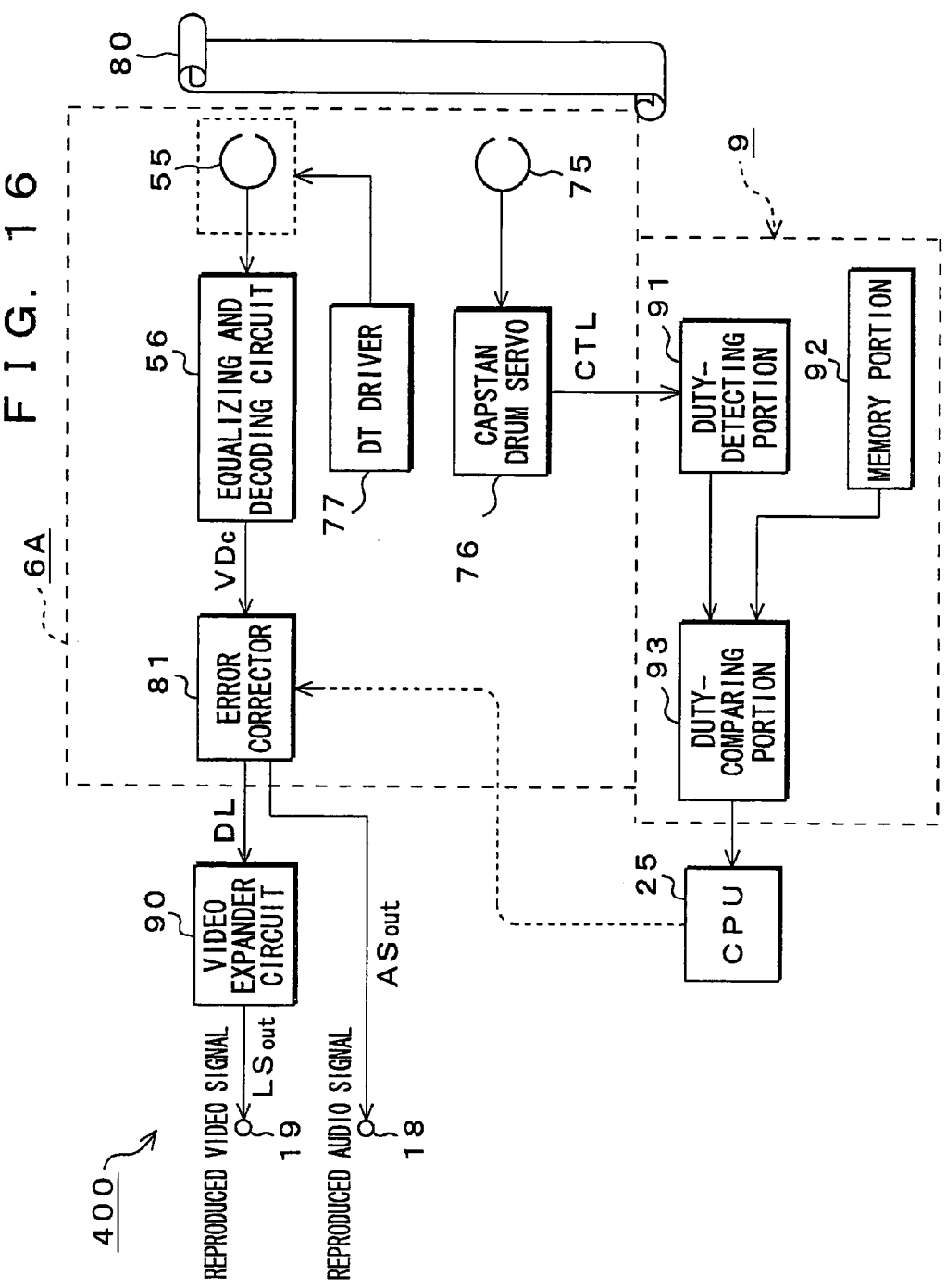

INFORMATION-RECORDING APPARATUS, INFORMATION-RECORDING METHOD, INFORMATION-REPRODUCING APPARATUS, INFORMATION-REPRODUCING METHOD, AND INFORMATION-RECORDING MEDIUM

BACKGROUND OF THE INVENTION

1. Field of the Invention

The present invention relates to an information-recording apparatus, an information-recording method, an information-reproducing apparatus, an information-reproducing method, and an information-recording medium, which are suitably applicable to a video recording and reproducing apparatus for home use or business use, for reproducing digital information from a tape recording medium.

2. Description of Related Art

In recent years, a video recording and reproducing apparatus for recording digital information, such as video data and audio data, in a tape recording medium for home use or business use and reproducing the digital information from this tape recording medium has been often used. A cassette having a magnetic tape wound around its reel is mounted on such a video recording and reproducing apparatus. Multiple recording magnetic heads (herein after, referred to as "recording heads") record digital information in a magnetic tape. Video data and audio data are recorded as digital information in the magnetic tape. Multiple reproducing magnetic heads (herein after, referred to as "reproducing heads") reproduce the video data and audio data recorded in this magnetic tape.

According to a mapping example of video data Dv and audio data Da in a conventional system, the following problems remain unsolved.

If an attempt is made to record in a tape recording medium digital information on left and right frames for three-dimensional display, which is acquired by shooting an object from the left and right at the same time. Or if an attempt is made to reproduce the digital information on the left and right frames for three-dimensional display from that tape recording medium, it is difficult to make digital information on the left and right contiguous frames for three-dimensional display compatible with digital information on a contiguous right frame or digital information on a contiguous left frame.

Therefore, it is difficult to reproduce digital information on a contiguous right or left frame for three-dimensional display by a general image display device without having an additional special image display function.

SUMMARY OF THE INVENTION

The present invention solves the foregoing conventional problems. It is an object of the present invention to provide an information-recording apparatus, an information-recording method, an information-reproducing apparatus, an information-reproducing method, and an information-recording medium, which are capable of making digital information on the left and right contiguous frames for three-dimensional display compatible with digital information on a contiguous right frame or digital information on a contiguous left frame and which are capable of reproducing digital information on a contiguous right or left frame for three-dimensional display by a general image display device without having an additional special image display function.

According to the invention, the foregoing object is attained in an information recording medium by an information-recording apparatus for recording digital information on left and right frames for three-dimensional display, which is acquired by shooting an object from the left and right at the same time. The recording apparatus comprises a recorder for recording in the information recording medium the digital information for three-dimensional display with the digital information being alternately arranged at the left and right frames at a speed which is "n" times as high as the speed for recording digital information on one frame for normal display in units of an error correction configuration and an information recording format, which correspond to the digital information on one frame for normal display.

With the information-recording apparatus according to the present invention, when the digital information on the left and right frames for three-dimensional display is recorded in the information recording medium, the recorder records in the information recording medium the digital information for three-dimensional display with it being alternately arranged in the left and right frames at a speed which is "n" times as high as the speed of recording digital information on one frame for normal display and in units of an error correction configuration and an information recording format, which correspond to the digital information on one frame for normal display.

At this time, the recorder modulates a servo control signal serving as a reference when reproducing the digital information for three-dimensional display and records the modulated signal in the information recording medium. Alternatively, the recorder modulates a waveform duty of this servo control signal according to the left and right frames of the digital information for three-dimensional display.

Therefore, during information reproduction, this allows the digital information on contiguous left and right frames for three-dimensional display to be made compatible with digital information on a contiguous right frame or digital information on a contiguous left frame. In this manner, a general image display device without having an additional special image display function reproduces the digital information on the contiguous right or left frame for three-dimensional display.

In accordance with another aspect of the invention, the information recording method is provided for recording in an information recording medium digital information on left and right frames for three-dimensional display, which is acquired by shooting an object from the left and right at the same time. The recording method comprises a step of recording in the information recording medium the digital information for three-dimensional display with the digital information being alternately arranged at the left and right frames at a speed which is "n" times as high as the speed for recording digital information on one frame for normal display in units of an error correction configuration and an information recording format, which correspond to the digital information on one frame for normal display.

When the digital information on left and right frames for three-dimensional display, which is acquired by shooting an object from the left and right at the same time, is reproduced from an information recording medium, the information-recording method according to the present invention allows the digital information on contiguous left and right frames for three-dimensional display to be made compatible with digital information on a contiguous right frame or digital information on a contiguous left frame. Therefore, this allows the digital information on the contiguous right or left frame for three-dimensional display to be reproduced by a general image display device without having an additional special image display function.

In accordance with a further aspect of the invention, the information-reproducing apparatus is provided for reproducing from an information-recording medium digital information on left and right frames for three-dimensional display, which is acquired by shooting an object from the left and right at the same time. The apparatus comprises a reproducer for reproducing digital information on left and right frames for three-dimensional display by reading the digital information on left and right frames alternately out of the information-recording medium at a speed which is "n" times as high as the speed of reproducing digital information on one frame for normal display in units of an error correction configuration and an information recording format, which correspond to the digital information on one frame for normal display.

When the digital information on left and right frames for three-dimensional display is reproduced, which is acquired by photographing an object from the left and right at the same time, the information-reproducing apparatus according to the present invention reproduces from an information-recording medium the digital information on the left and right frames for three-dimensional display by reading the digital information on the left frame and the digital information on the right frame alternately out of the information-recording medium at a speed which is "n" times as high as the speed of reproducing digital information on one frame for normal display in units of an error correction configuration and an information recording format, which correspond to the digital information on one frame for normal display.

For example, the reproducer reproduces a servo control signal serving as a reference during reproduction of digital information for three-dimensional display from the information-recording medium. The judgement apparatus detects a waveform duty of this servo control signal and judges a recording format of the digital information. In addition, the controller detects a waveform duty of a servo control signal and controls the reproducer to reproduce the digital information on the right frame or the digital information on the left frame based on the waveform duty.

This allows the digital information on contiguous left and right frames for three-dimensional display to be made compatible with the digital information on a contiguous right frame or the digital information on a contiguous left frame. In this manner, a general image display device without having an additional special image display function reproduces the digital information on the contiguous left or right frame for three-dimensional display.

In accordance with a still further aspect of the invention, the information-reproducing method is provided for reproducing from an information recording medium digital information on left and right frames for three-dimensional display, which is acquired by shooting an object from the left and right at the same time. The method comprises the step of reproducing digital information on left and right frames for three-dimensional display by alternately reading out the left and right frames from the information recording medium at a speed which is "n" times as high as the speed of reproducing digital information on one frame for normal display and in units of an error correction configuration and an information recording format which correspond to the digital information on one frame for normal display.

When the digital information on left and right frames for three-dimensional display is reproduced from the information-recording medium, which is acquired by shooting an object from the left and right at the same time, the information-reproducing method according to the present invention allows the digital information on contiguous left and right frames for three-dimensional display to be made compatible with the digital information on a contiguous right frame or the digital information on a contiguous left frame. Therefore, a general image display without having an additional special image display function reproduces digital information on the contiguous right or left frame for three-dimensional display.

In accordance with still another aspect of the invention, the information-recording medium having recorded therein digital information on left and right frames for three-dimensional display, which is acquired by shooting an object from the left and right at the same time is provided. In the medium, the digital information for three-dimensional display is recorded with the digital information being alternately arranged in the left and right frames at a speed which is "n" times as high as the speed of recording digital information on one frame for normal display in units of an error correction configuration and an information recording format, which correspond to the digital information on one frame for normal display.

With the information-recording medium according to the present invention, digital information on a contiguous right frame or digital information on a contiguous left frame is read out of the digital information on the contiguous left and right frames for three-dimensional display. Therefore, compatible software for reproducing digital information on the contiguous right or left frame for three-dimensional display in a general image display device without having an additional special image display function is provided.

Additional objects and advantages of the invention will be set forth in the description which follows and, in part, will be obvious from the description, or may be learned by practice of the invention. The objects and advantages of the invention may be realized and obtained by means of the instrumentalities and combinations particularly pointed out herein after.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principle of the present invention.

FIG. 1 is a conceptual view for showing a configuration of a video and audio recording and reproducing system 10 for a three-dimensional image, which is obtained by applying an information-recording apparatus and an information-reproducing apparatus according to one embodiment of the present invention;

FIGS. 7A to FIG. 7C are views each showing a configuration of a product code in recording video data, recording audio data, and the like;

FIG. 14 is a block diagram for showing an internal configuration according to an error corrector 81 or the like;

FIG. 16 is a view for showing a configuration of a reproducing system of VTR 400 according to a fourth embodiment of the present invention.

DETAILED DESCRIPTION OF THE INVENTION

Figure 2:
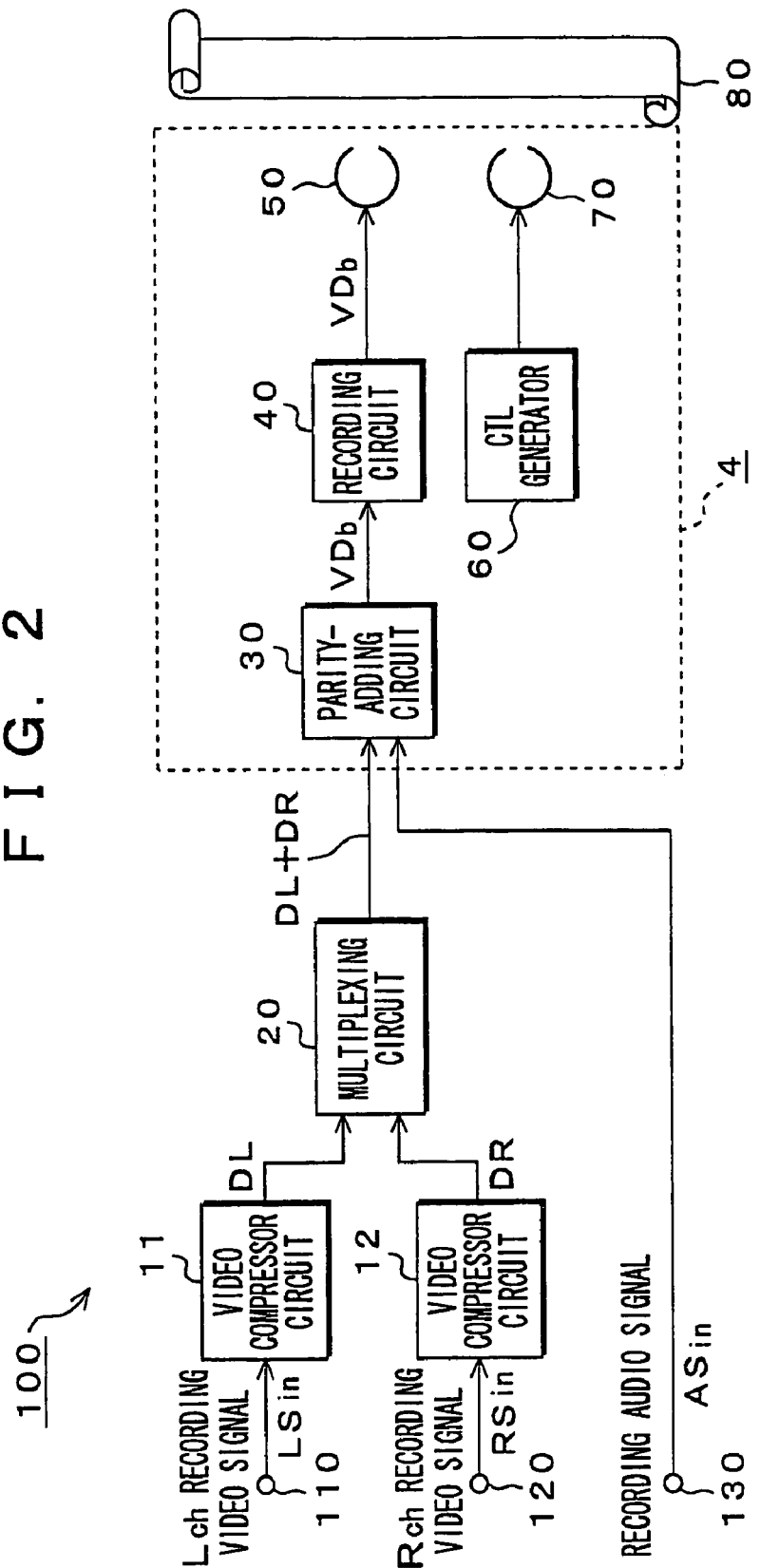
FIG. 2 is a block diagram for depicting a configuration of a recording system of VTR 100 according to a first embodiment of the present invention.

Reference will now be made in detail to the presently-preferred embodiments of the invention as illustrated in the accompanying drawings, in which like reference numerals designate like or corresponding parts.

Hereinafter, an information-recording apparatus, an information-recording method, an information-reproducing apparatus, an information-reproducing method, and an information-recording medium according to one preferred embodiment of the present invention will be described with reference to the accompanying drawings.

FIG. 1 is a conceptual view showing a configuration of a video and audio recording and reproducing system 10 obtained by applying an information-recording apparatus and an information-reproducing apparatus according to one embodiment of the present invention.

In this embodiment, there is provided a recorder for recording in an information-recording medium digital information on left and right frames for three-dimensional display, the digital information being acquired by shooting an object from the left and right at the same time. The recorder records the digital information for three-dimensional display in the information recording medium with the digital information being alternately arranged on left and right frames at a speed which is "n" times as high as the speed of recording digital information on one frame for normal display in units of an error correction configuration and an information recording format, which correspond to the digital information on one frame for normal display. This allows the digital information on the left and right contiguous frames for three-dimensional display to be made compatible with digital information on a contiguous left frame or digital information on a contiguous right frame. Thus, a general image display device without having an additional special image display function reproduces the digital information on a contiguous right or left frame for three-dimensional display.

The video and audio recording and reproducing system 10 for a three-dimensional image as shown in FIG. 1 comprises a VTR (Video Tape Recorder) 100 as one example of the information-recording apparatus and the information-reproducing apparatus. This VTR 100 records in an information-recording medium digital information on left and right frames for three-dimensional display and reproduces the digital information. In the system 10, the digital information is acquired by shooting an object 1 from the left and right at the same time. This VTR 100 is suitably applied to a video recording and reproducing apparatus for home use and business use for reproducing the digital information from a magnetic tape (tape recording medium), which is one example of the information-recording medium.

For example, a video camera #1 is allocated at the right side of an object 1, and it acquires a still picture or moving image information, which is one example of digital information shot from the right side of the object 1. Then, the video camera #1 outputs the acquired information to the VTR 100 as a recording video (Video) signal of a right channel (herein after, referred to as "Rch"). In this example, the video camera #1 positioned at the right side shoots an uppercase letter "A", which is one example of the object 1.

In addition, a video camera #2 is allocated at the left side of the object 1, and it acquires a still picture or moving image information shot from the left side of the object 1. Then, the video camera #2 outputs the acquired information to the VTR 100 as a Video signal of a left channel (herein after, referred to as "Lch"). In this example, the video camera #2 positioned at the left side shoots the uppercase letter "A".

A monaural microphone 2 is allocated between these two cameras #1 and #2; voice and music information collected from the center of object 1 is acquired; and the monaural microphone 2 outputs an audio (Audio) signal to the VTR 100. Of course, the microphone 2 is not limited to the monaural system, and it may employ a stereo system for collecting voice and music information from microphones disposed to the cameras #1 and #2 allocating the left and right of the object 1. In this embodiment, a description will be given with respect to a case of handling a recording audio signal in the monaural system. Namely, in the VTR 100, a recording audio signal output from the microphone 2 is recorded in a magnetic tape.

One monitor 101, for example, is connected to this VTR 100. At the monitor 101, a speaker 3 is incorporated or is externally mounted and used. On the monitor 101, duplex still picture or moving image information with their different phases is displayed based on an Rch and Lch recorded video signal, and voice or music information based on the recording audio signal acquired by the microphone 2 is output from the speaker 3.

Mounting special glasses 102 allows this duplex still picture or moving image information to be viewed in a three-dimensional way. An uppercase letter "A" shot by the video camera #1 and an uppercase letter "A" shot by the video camera #2 can be viewed in a three-dimensional manner when they are viewed by wearing the special glasses 102. If the special glasses 102 are not worn, the uppercase letter "A" can be viewed as a duplex still picture. Now, a description will be given separately with respect to the VTR 100 for an information-recording system thereof and an information-reproducing system thereof.

[Information-Recording Apparatus]

FIG. 2 is a block diagram for depicting a configuration of a recording system of VTR 100 according to a first embodiment of the present invention. The recording system of VTR 100 shown in FIG. 2 has a recorder 4, video compressor circuits 11 and 12, and a multiplexing circuit 20. In this example, there is exemplified a case in which a recording video signal is compressed, and then, video data and audio data are multiplexed.

The VTR 100 shown in FIG. 2 has an input terminal 110 for video L, an input terminal 120 for video R, and an audio input terminal 130. The video compressor circuit 11 is connected to the input terminal 110 for video L, and receives and compresses an Lch recording video signal LSin from a video camera #1. For example, in the video compressor circuit 11, the Lch recording video signal LSin is divided into two-dimensional blocks each having 8×8 pixels, and data compression processing is carried out thereon using block encoding, such as DCT.

In addition, the video compressor circuit 12 is connected to the input terminal 120 for video R and receives and compresses an Rch recording video signal RSin from a video camera #2. In the video compressor circuit 12, similarly, the Rch recording video signal RSin is divided into two-dimensional blocks each having 8×8 pixels, and data compression processing is carried out using block encoding, such as DCT.

The multiplexing circuit 20 is connected to the video compressor circuits 11 and 12 and multiplexes Rch video data DR after compression and Lch video data DL after compression. The multiplexing circuit 20 outputs the Rch and Lch video data DR+DL after multiplexing to the recorder 4.

The recorder 4 records in a magnetic tape 80 digital information for three-dimensional display with the digital information being alternately arranged in left and right frames at a speed which is "n" times as high as the speed of recording digital information on one frame for normal display in units of an error correction configuration and an information recording format, which correspond to the digital information on one frame for the normal display. Now, a description of this embodiment will be given with respect to a case of n=2.

For example, the recorder 4 has a parity-adding circuit 30, a recording circuit 40, a helical recording head 50, a CLT generator 60, and a CTL recording head 70. The parity-adding circuit 30 is connected to the above described multiplexing circuit 20 and the audio input terminal 130. The parity-adding circuit 30 receives multiplexed Rch and Lch video data (compression-encoded multiplex data) DR+DL and a recording audio signal ASin. For this compression-encoded multiplex data DR+DL, the parity-adding circuit 30 performs error correction using a product code in units of encoding. It also performs error correction using a product code for the recording audio signal ASin.

The recording circuit 40 receives and amplifies video data (error-corrected encoding data) VDb from the parity-adding circuit 30. The recording circuit 40 outputs the amplified error-corrected encoding data VDb to the helical recording head 50. The helical recording head 50 sequentially records error-corrected encoding data VDb in a recording track of a magnetic tape 80.

The CTL generator 60 generates a servo control signal (herein after, referred to as "CTL signal") serving as a reference when the error-corrected encoding data (digital information) VDb for three-dimensional display is reproduced. The CTL generator 60 modulates and outputs the CTL signal to the CTL recording head 70. For example, the CTL generator 60 modulates a waveform duty of the CTL signal according to the left and right frames of error-corrected encoding data VDb for three-dimensional display. The CTL recording head 70 records in the magnetic tape 80 the modulated CTL signal that is output from the CTL generator 60. In this manner, digital information in the contiguous left and right frames for three-dimensional display is classified into digital information on a contiguous right frame or digital information on a contiguous left frame.

Figure 3:
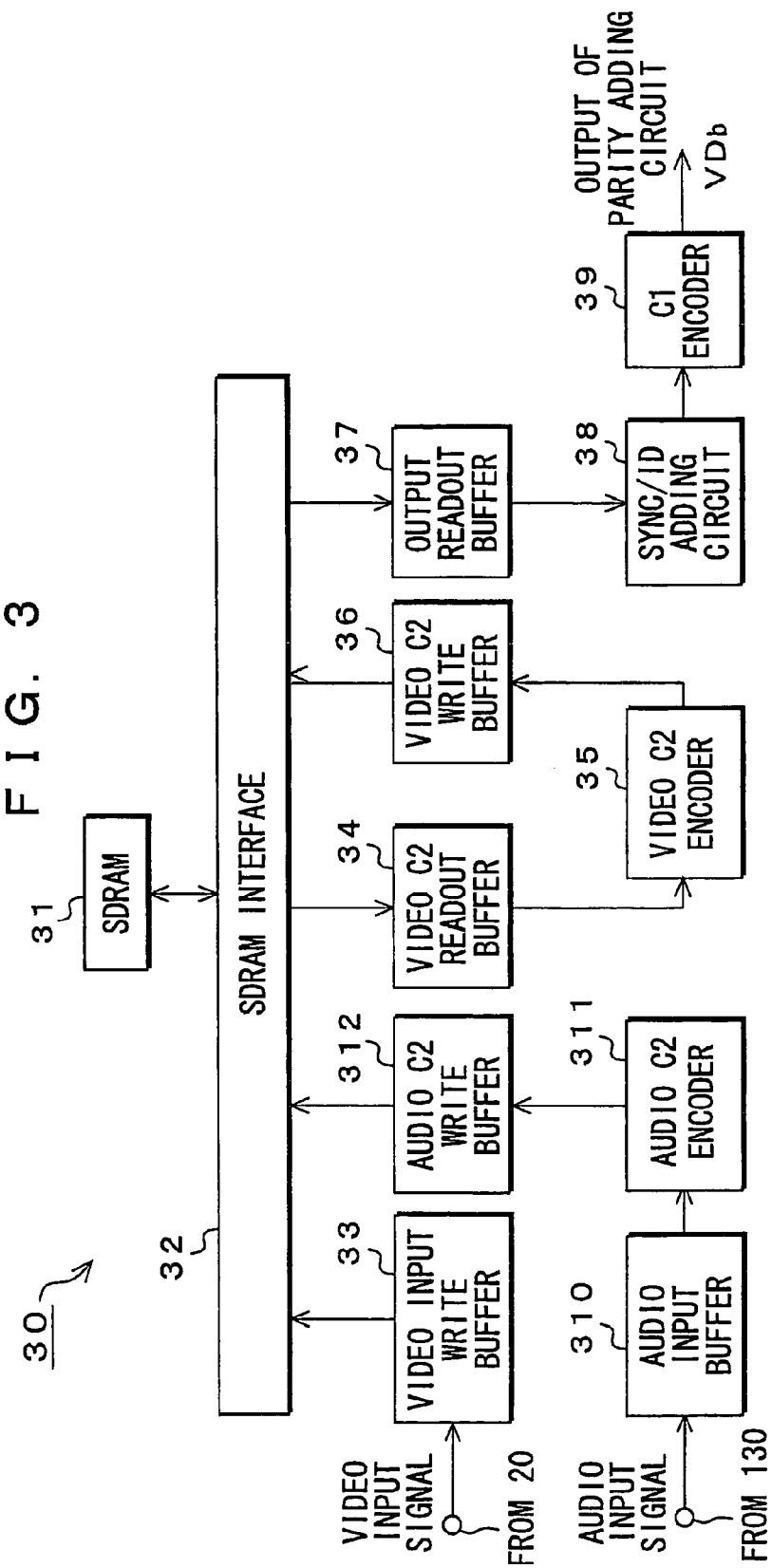
FIG. 3 is a block diagram for depicting an internal configuration of a parity-adding circuit 30.

FIG. 3 is a block diagram for depicting an internal configuration of the parity-adding circuit 30. The parity-adding circuit 30 shown in FIG. 3 has an SDRAM (Synchronous Dynamic RAM) 31 and an SDRAM interface 32, which is an interface for carrying out writing and reading the data in and out of this SDRAM 31. The SDRAM 31 has a capacity capable of storing video data Dv in a plurality of fields. In this case, in the SDRAM 31, a memory space corresponding to 36 ECC blocks is provided with respect to each of the fields of Rch and Lch.

A video-input write buffer 33 is connected to this SDRAM interface 32 and is used as a buffer for writing into the SDRAM 31 the video data (compression-encoded multiplex data) DR+DL supplied from the above-described multiplexing circuit 20. A video C2 readout buffer 34 is connected to the SDRAM interface 32 and is used as a buffer for supplying to the video C2 encoder 35, which will be described later, the video data Dv corresponding to 36 ECC blocks and being read out from the SDRAM 31.

The C2 encoder 35 is connected to this C2 readout buffer 34 and computes a C2 parity (external code parity) in 36 ECC blocks with respect to each field. The C2 encoder 35 has 36 computers for computing the C2 parity and computes in parallel the C2 parity in the above-described 36 ECC blocks. Thus, the video data corresponding to the 36 ECC blocks is supplied in parallel from the C2 readout buffer 34 to the C2 encoder 35. In that case, the video data for each ECC block is supplied in order of the data in 0th to 113th synchronous blocks.

In addition, the C2 write buffer 36 is connected to the C2 encoder 35 and is used as a buffer for writing into the SDRAM 31 the C2 parities in 36 ECC blocks, each of the C2 parities being computed by the C2 encoder 35, with respect to each field. Further, an output readout buffer 37 is connected to the SDRAM interface 32 and is used as a buffer for outputting the video data and C2 parity corresponding to 36 ECC blocks, the data and parity being read out from the SDRAM 31, with respect to each field.

Video data Dv is input in order of C1=Sync. This is because compression macro-blocks are embedded in synchronous units. In this manner, in the case where one sync is hit during shuttle reproduction, the corresponding macro-block is updated. Therefore, video data Dv is written in a direction of C1, and then, the written data is read out in a direction of C2 so as to carry out C2 correction processing. In contrast, audio data Da does not require the same processing as the video data Dv. The audio data Da is written into the SDRAM 31 after the C2 code has been multiplied.

For example, an audio input buffer 310 is connected to the SDRAM interface 32 and is used as a buffer for inputting a recording audio signal ASin supplied from the audio input terminal 130. An audio C2 encoder 311 is connected to the input buffer 310 and computes the C2 parity (external code parity) in 24 ECC blocks with respect to each field. In this C2 correction processing, recording audio signals ASin are input in order of C2 rows. An audio C2 write buffer 312 is connected to the C2 encoder 311 and is used as a buffer for writing into the SDRAM 31 via the SDRAM interface 32 the audio data Da and C2 parity corresponding to 24 ECC blocks with respect to each field.

Furthermore, an SYNC/ID adding circuit 38 is connected to the output readout buffer 37 and adds sync data and ID to a data row of video data (or C2 parity) in each sync-block output in recording order from the output readout buffer 37. A C1 encoder 39 is connected to this SYNC/ID adding circuit 38 and computes and adds the C1 parity to the video data Dv and audio data Da in each sync-block to which the sync data and ID have been added to output the recording data VDb (video data Dv plus audio data Da is the recording data VDb).

Figure 4:
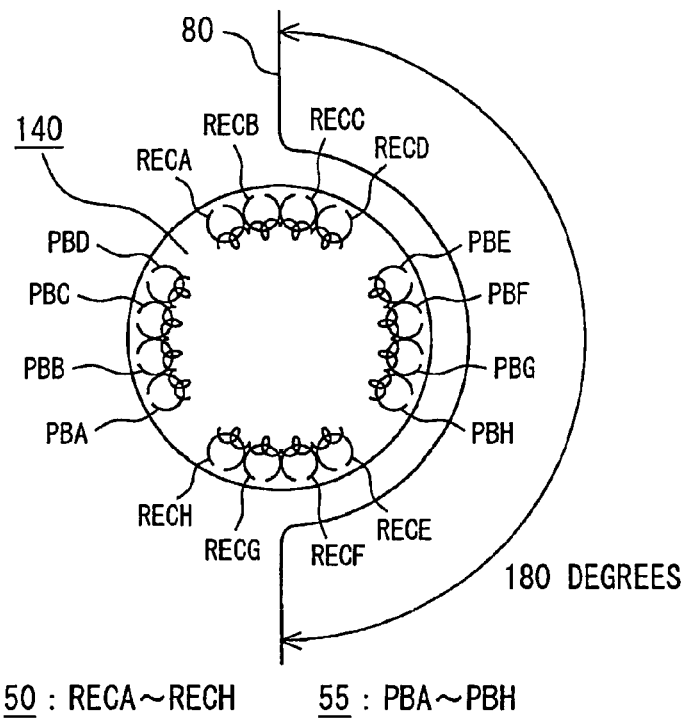
FIG. 4 is a conceptual view for showing a configuration of a rotary drum 140 according to the recording system of VTR 100 shown in FIG. 2.

FIG. 4 is a conceptual view for showing a configuration of a rotary drum 140 according to the VTR 100 shown in FIG. 2. The rotary drum 140 shown in FIG. 4 is equipped with a helical recording head (magnetic head) 50 and a helical reproducing head 55, which will be described later. For example, a magnetic tape 80 is wound around the rotary drum 140 obliquely with a winding angle of 180 degrees. The magnetic tape 80 runs at a predetermined speed in a state in which the tape is thus wound around the rotary drum 140.

In addition, four recording heads RECA to RECD are allocated at the rotary drum 140, and four recording heads RECE to RECH are allocated with respect to these recording heads RECA to RECD with an angle interval of 180 degrees. Further, eight reproducing heads PBA to PBH corresponding to the recording heads RECA to RECH are allocated at the rotary drum 140. These reproducing heads are allocated with respect to recording heads RECA to RECH with an angle interval of 90 degrees, respectively. Namely, the helical recording head 50 is composed of eight recording heads RECA to RECH, and a helical reproducing head 55 is composed of eight reproducing heads PBA to PBH.

[Information-Recording Medium]

Figure 5:
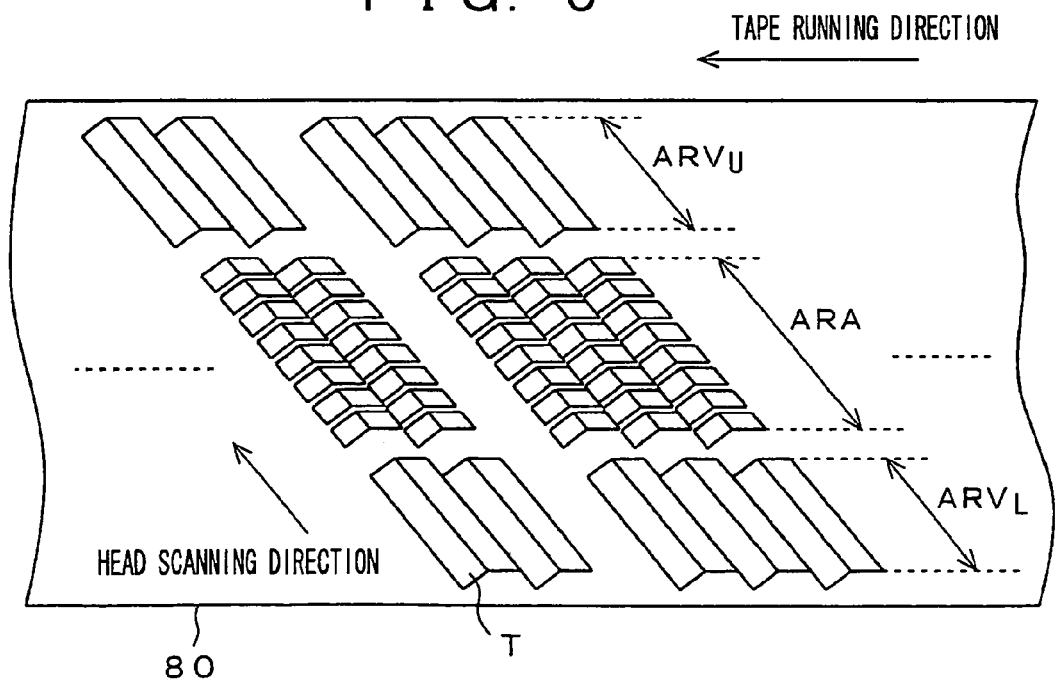
FIG. 5 is a view for showing an example of a recording format in a magnetic tape 80.

FIG. 5 shows an example of a recording format in a magnetic tape 80. The magnetic tape 80 shown in FIG. 5 is provided as a medium having recorded therein digital information on left and right frames for three-dimensional display, the digital information being acquired by shooting the object 1 shown in FIG. 1 from the left and right at the same time. In this magnetic tape 80, digital information for three-dimensional display is recorded with it being alternately arranged in the left and right frames at a speed which is two times as high as the speed of recording digital information on one frame for normal display in units of an error correction configuration and an information recording format, which correspond to the digital information on one frame for normal display.

In this magnetic tape 80, tracks T tilted with respect to the tape's longitudinal direction are sequentially formed. In this case, recording azimuths in the two tracks T adjacent to each other are provided so as to be different from each other. Regions at a start of a scanning edge side and at an end of a scanning edge side of a track T are allocated to video data regions $ARV_L$ and $ARV_U$, respectively. Video data DR+DL output from the above described parity-adding circuit 30 is recorded in these video data regions $ARV_L$ and $ARV_U$. In addition, a region sandwiched between the video regions $ARV_L$ and $ARV_U$ of track T is allocated to an audio data region ARA. Audio data Da is also recorded in this region ARA.

Figure 6:
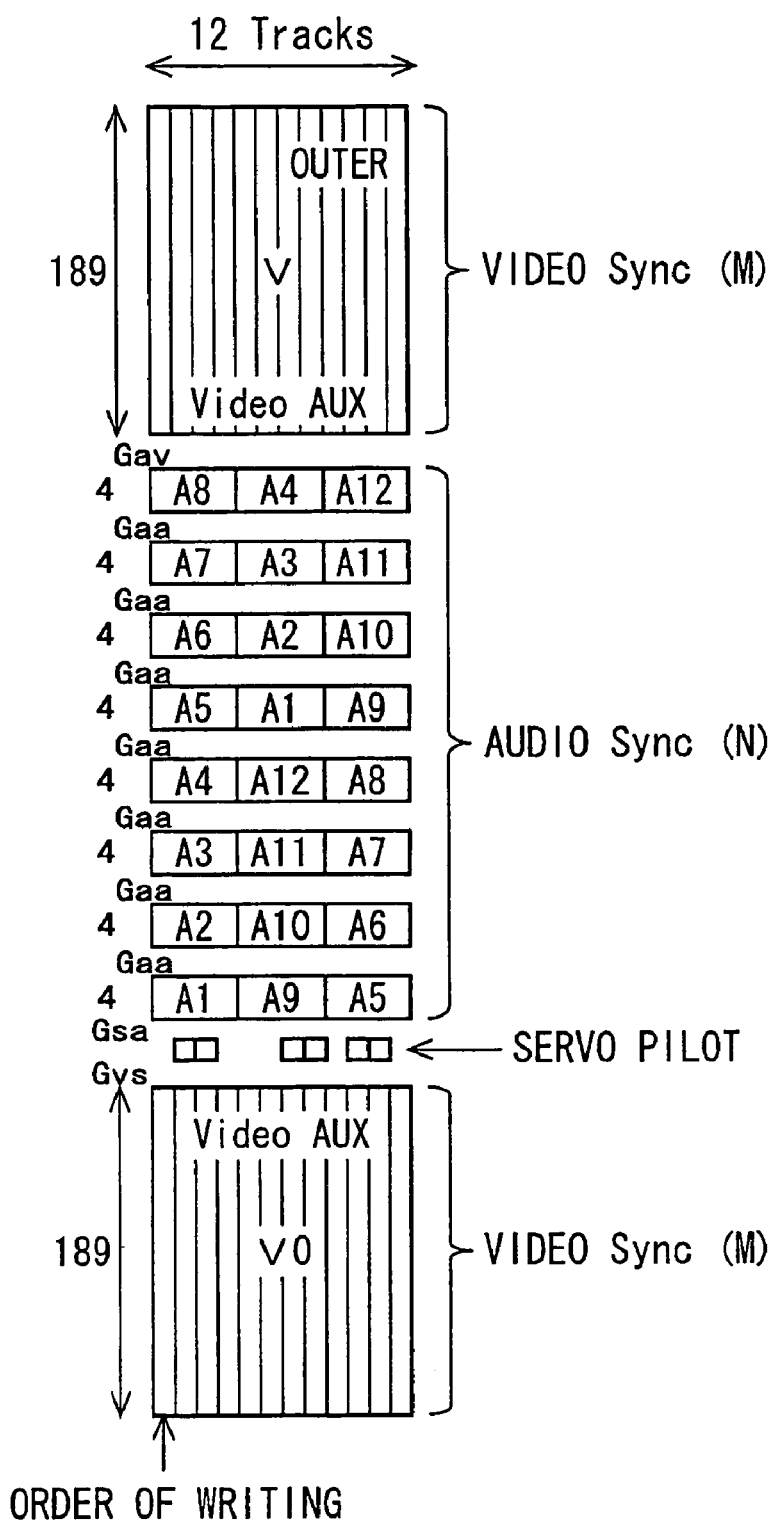
FIG. 6 is a view for showing an example of a foot print in the recording system of VTR 100.
Figure 7A:
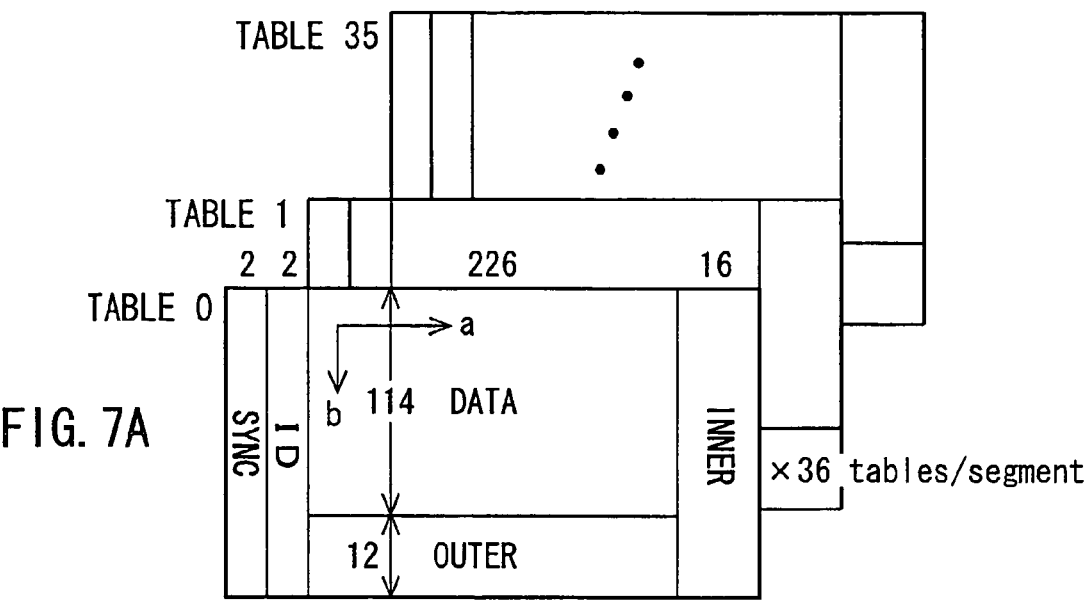

FIG. 6 shows an example of a footprint in a VTR 100. FIG. 7A shows a configuration of a product code of video data DR+DL. In this example, video data DR in one field of Rch and video data DL in one field of Lch are respectively recorded in 12 tracks. During recording and reproducing the data, four tracks are scanned at the same time by four heads in one scan and, therefore, 12 tracks are scanned in three scans.

The footprint (ECC configuration and data recording format) shown in FIG. 6 is provided as a format recorded by the helical recording head 50 shown in FIG. 2. As described previously, the helical recording head 50 is actually composed of eight recording heads RECA to RECH, as shown in FIG. 4. The video data region $ARV_U$ shown in FIG. 5 is allocated to an upper video sync (sync: (M)) in 12 tracks of the footprint shown in FIG. 6. In this video sync (M), 36 ECC blocks (data in units of encoding) are recorded, including table 0 to table 35 as shown in FIG. 7A.

Similarly, the video data region $ARV_L$ shown in FIG. 5 is allocated to a lower video sync (M) shown in FIG. 6. In this video sync (M), 36 ECC blocks (data in units of encoding) are recorded including table 0 to table 35 as shown in FIG. 7A. The size of video sync (M) at each of the upper and lower video syncs is 12 tracks×189 bytes. Audio Sync (N) is allocated between these upper and lower video syncs (M), and audio data Da is recorded on the Audio Sync (N). The Audio Sync (N) is segmented into eight segments, and the size of one segment is 4 bytes×12 tracks.

Assuming that the recording head 50 is scanned from the side of lower video sync (M) to the side of upper video sync (M), audio data A1, A9, and A5 are allocated to a first segment; audio data A2, A10, and A6 are allocated to a second segment; audio data A3, A11, and A7 are allocated to a third segment; audio data A4, A12, and A8 are allocated to a fourth segment; audio data A5, A1, and A9 are allocated to a fifth segment; audio data A6, A2, and A10 are allocated to a sixth segment; audio data A7, A3, and A11 are allocated to a seventh segment; and audio data A8, A4, and A12 are allocated to an eighth segment.

In addition, a gap Gav is allocated between the upper video sync (M) and audio sync (N) in the eighth segment. A gap Gaa is allocated between audio syncs of the segments. A servo pilot (servo control signal: CTL signal) is allocated between the audio sync (N) of the first segment and the lower video sync (M). A gap Gsa is allocated between the audio sync (N) of the first segment and the servo pilot. A gap Gvs is allocated between this servo pilot and the lower video sync (M). This is because a signal processing space is provided during reproduction.

One ECC block is configured as follows. That is, with respect to video data consisting of a data array having 226 bytes×114 bytes shown in FIG. 7A, data in each column (a data string) are encoded by, for example, a (126, 114) Reed-Solomon code for an external code computation data series indicated by the arrow "b", thereby generating a C2 parity of 12 bytes (external code parity: OUTER). Further, with respect to the video data and the C2 parity, data on each row (a data string) are encoded by, for example, a (242, 226) Reed-Solomon code for an internal code computation data series indicated by the arrow "a" shown in FIG. 7A, thereby generating a 16 byte C1 parity (internal code parity: INNER). In addition, sync data and an ID each having the size of 2 bytes are arranged at the head of each data row.

Figure 7B:
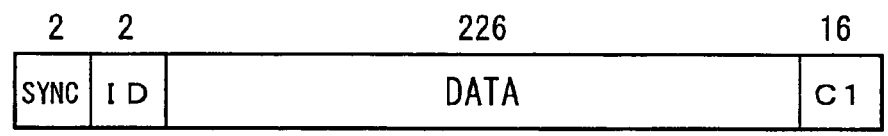

FIG. 7B shows a configuration of one sync-block in an ECC block. The first two bytes shown in FIG. 7B are sync data. The next 2 bytes are an ID. This ID includes track ID for identifying which of 12 tracks records such one sync-block and a sync-block ID for identifying which of a plurality of sync-blocks recorded in one tilt track has such one sync-block. In addition, one segment is configured for 12 tracks, and segment numbers 0 to 3 are sequentially assigned repeatedly. The above-described ID of 2 bytes also includes a segment ID indicating a segment number of a segment having such one sync-block recorded therein. In addition, this ID is followed by video data of 226 bytes (or C2 parity) and a CI parity of 16 bytes.

Figure 7C:
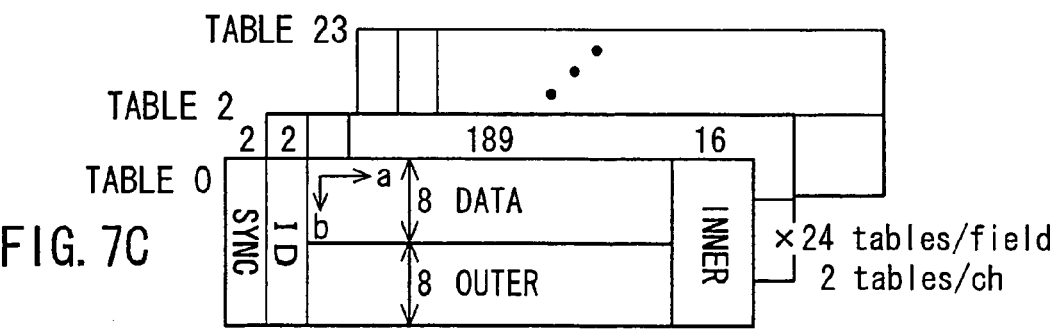

FIG. 7C shows a configuration of a product code of audio data Da. 24 ECC blocks (data in units of encoding), including table 0 to table 23 as shown in FIG. 7C, are recorded in audio Sync (N) of the footprint shown in FIG. 6. One ECC block is configured as follows.

That is, with respect to audio data consisting of a data array having 189 bytes×8 bytes, data on each column (a data string) are encoded by, for example, a (16, 8) Reed-Solomon code, for an external code computation data series indicated by the arrow "b", thereby generating a C2 parity of eight bytes (external code parity: OUTER). Further, with respect to these audio data and the C2 parity, data on each row (a data string) are encoded by, for example, a (205, 189) Reed-Solomon code, for an internal code computation data series indicated by the arrow "a" shown in FIG. 7C, thereby generating a C1 parity of 16 bytes (internal code parity: INNER). In addition, the sync data and ID each having the size of 2 bytes are arranged at the head of each data row.

Figure 8A:
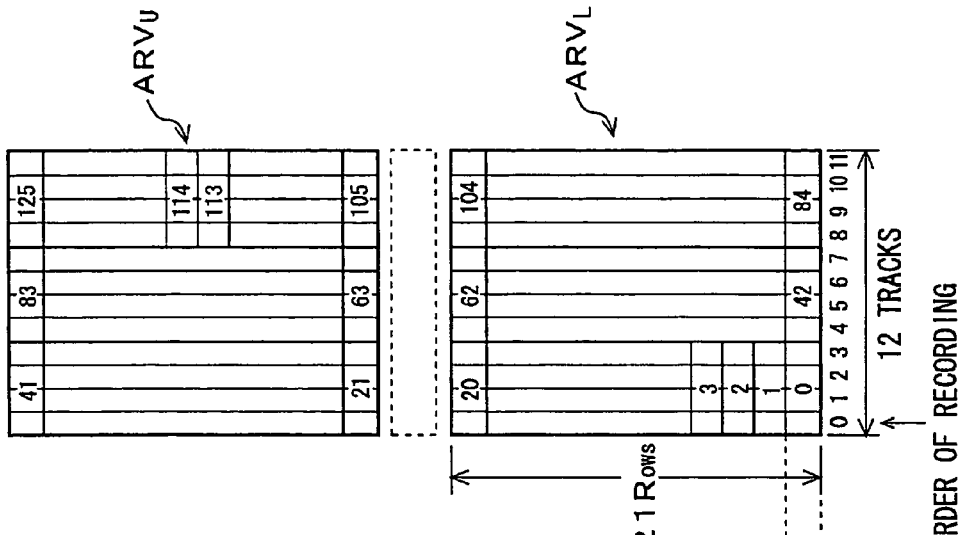
FIGS. 8A to FIG. 8C are views each showing an allocation example (1) of one sync-block of each ECC block in each of the video data regions $ARV_L$ and $ARV_U$ in 12 tracks constituting one segment.

FIG. 8 is a view for showing an allocation example (1) of one sync-block of each ECC block in video data regions $ARV_L$ and $ARV_U$ in 12 tracks configuring one segment. As shown in FIG. 8A, with respect to four tracks 0 to 3 scanned at a first time, sync-blocks in 21 rows including row 0 to row 20 in ECC blocks 0 to 35 are respectively recorded in the video data region $ARV_L$. Sync-blocks in 21 rows including row 21 to row 41 in ECC blocks 0 to 35 are respectively recorded in the video data region $ARV_U$.

In addition, with respect to four tracks 4 to 7 scanned at a second time, sync-blocks of 21 rows including row 42 to row 62 in ECC blocks 0 to 35 are respectively recorded in the video data region $ARV_L$, and sync-blocks of 21 rows including row 63 to row 83 in ECC blocks 0 to 35 are respectively recorded in the video data region $ARV_U$.

Further, with respect to four tracks 8 to 11 scanned at a third time, sync-blocks of 21 rows including row 84 to row 104 in ECC blocks 0 to 35 are respectively recorded in the video data region $ARV_L$, and sync-blocks of 21 rows including row 105 to row 125 in ECC blocks 0 to 35 are respectively recorded in the video data region $ARV_U$.

Figure 8B:
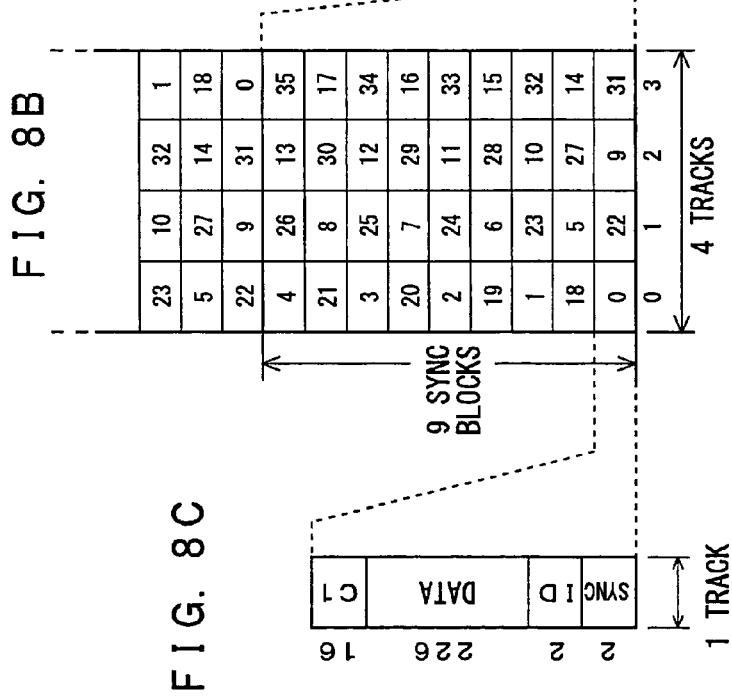

Here, a sync-block of row 0 is composed of a 0-th sync-block in each of the ECC blocks 0 to 35, and these 36 sync-blocks are recorded so as to be distributed into tracks 0 to 4 by 9 sync-blocks, as shown in FIG. 8B. Namely, track 0 records a 0-th sync-block in each of the ECC blocks 0, 18, 1, 19, 2, 20, 3, 21, and 4; track 1 records a 0-th sync-block in each of the ECC blocks 22, 5, 23, 6, 24, 7, 25, 8, and 26; track 2 records an 0-th sync-block in each of the ECC blocks 9, 27, 10, 28, 11, 29, 12, 30, and 13; and further, track 3 records an 0-th sync-block in each of the ECC blocks 31, 14, 32, 15, 33, 16, 34, 17, and 35.

Figure 8C:
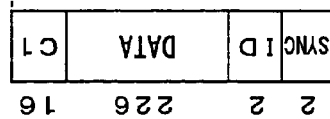

Hereinafter, similarly, sync-blocks of 1 to 125 rows are composed of 1st to 125th sync-blocks in each of the ECC blocks 0 to 35; and respective 36 sync-blocks are recorded so that they are distributed to the corresponding 4 tracks by nine sync-blocks. In this case, ECC blocks from which nine sync-blocks recorded into each of the four tracks are acquired are rotated for each row. One sync-block, as shown in FIG. 8C, is composed of sync data of 2 bytes, an ID of 2 bytes, video data (or C2 parity) of 226 bytes, and a C1 parity of 16 bytes.

Here, sync-blocks of row 0 to row 125 are sequentially recorded into 12 tracks, 0 to 11. In this case, sync-blocks of row 0 to row 113 are provided by the C1 parity being added to a data row of video data configuring an internal-code computation data series. Sync-blocks of row 114 to row 125 are provided by a C1 parity being added to a data row of a C2 parity configuring an internal-code computation data series.

Figure 9:
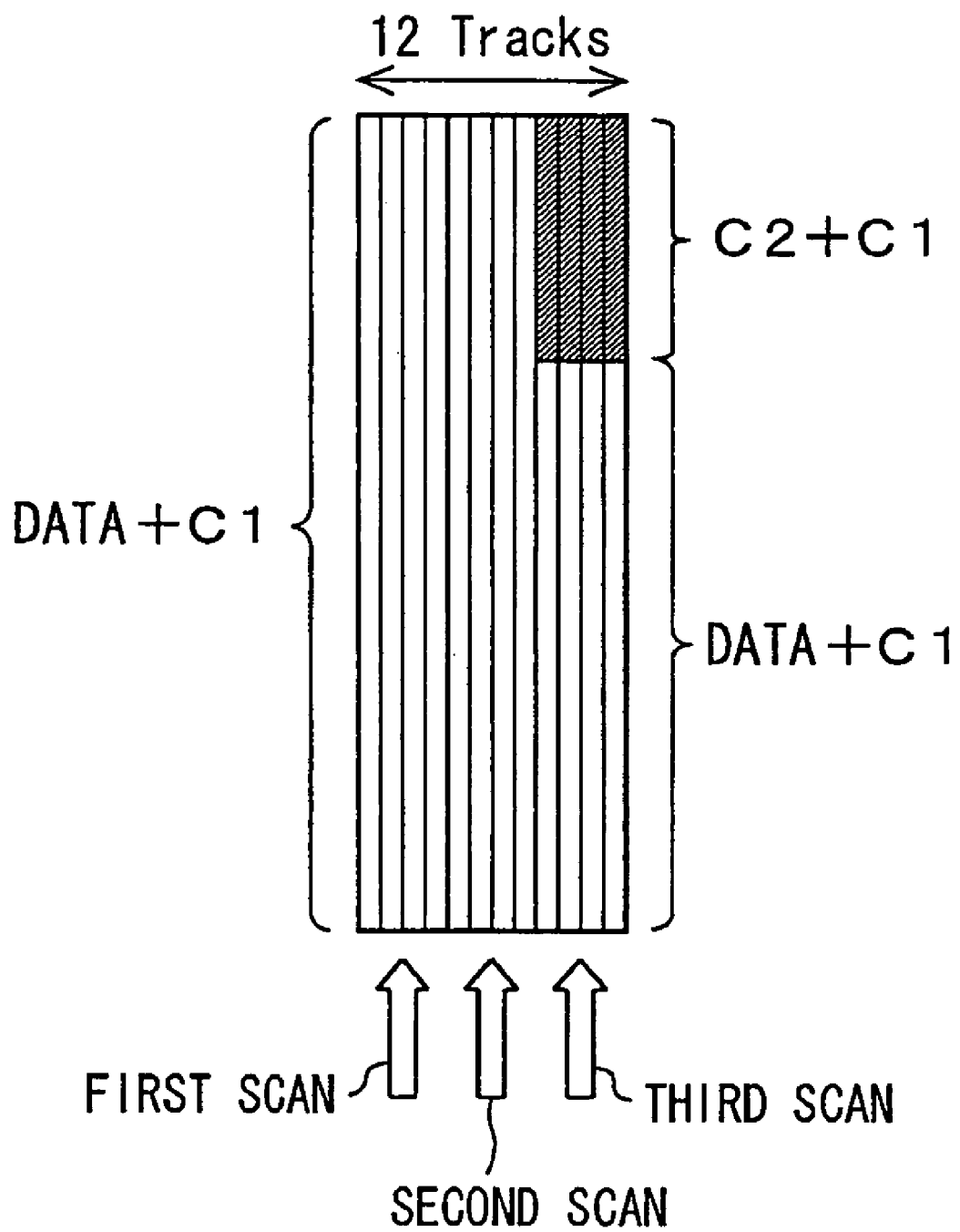
FIG. 9 is a view showing an allocation example (2) of one sync-block of each ECC block in each of the video data regions $ARV_L$ and $ARV_U$ in 12 tracks constituting one segment.

FIG. 9 shows an allocation example (2) of one sync-block of each ECC block in video data regions $ARV_L$ and $ARV_U$ of 12 tracks configuring one segment.

In this embodiment, when 36 ECC blocks, 0 to 35, are recorded in 12 tracks, as shown in FIG. 9, first sync-blocks are first sequentially recorded with a C1 parity being added to a data string of video data configuring an internal code computation data series. After recording of the first sync-blocks has terminated, second sync-blocks are sequentially recorded with a C1 parity being added to a data string of a C2 parity configuring an internal code computation data series.

Figure 10:
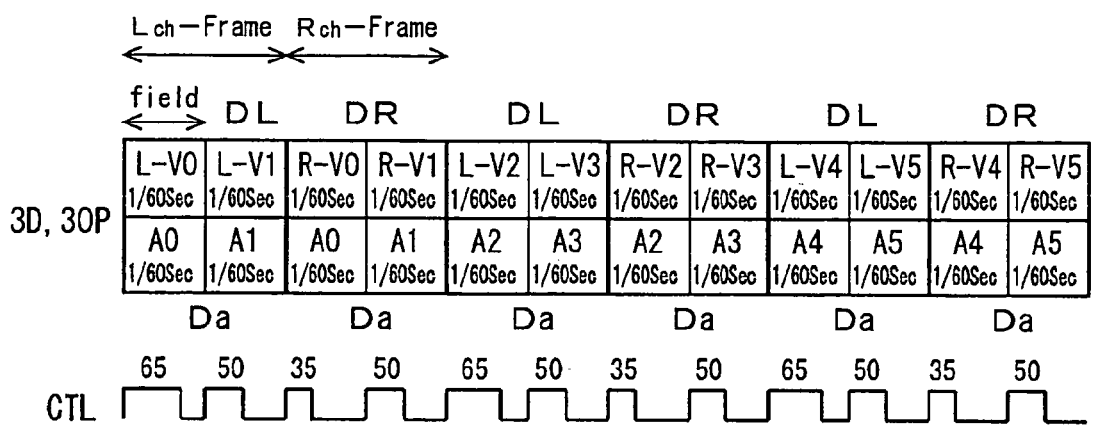
FIG. 10 is a view for showing a mapping example of video data DR and DL and audio data Da in the video and audio recording and reproducing system 10 for a three-dimensional image.
Figure 11A:
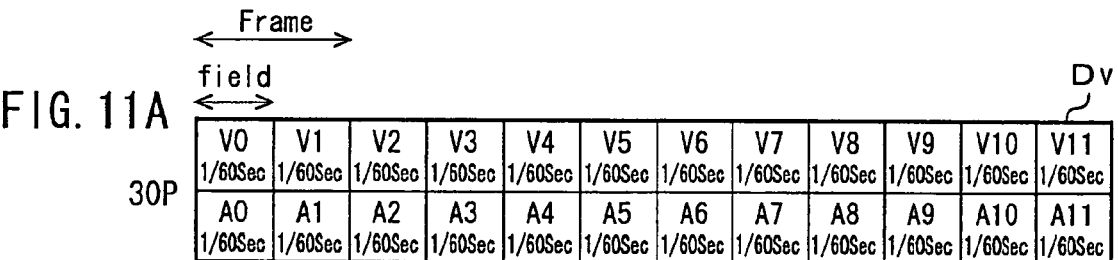
FIGS. 11A and FIG. 11B are views each showing a mapping example of video data Dv and audio data Da as a comparative example.
Figure 11B:
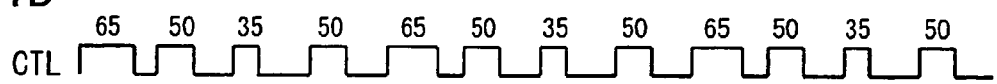

Now, operations in the recording system of VTR 100 will be described here. FIG. 10 shows a mapping example of video data DR and DL and audio data Da in a three-dimensional image and audio recording and reproducing system 10. FIG. 11A and FIG. 11B show a mapping example of video data Dv and audio data Da, respectively, as a comparative example.

In this embodiment, it is presumed that digital information on left and right frames for three-dimensional display, the digital information being acquired by shooting an object 1 from the left and right at the same time, is recorded in a magnetic tape 80. According to the mapping example (3D, 30P) of video data DR+DL and audio data Da shown in FIG. 10, video data DR+DL for three-dimensional display are recorded to be alternately arranged in the left and right frames in units of an error correction configuration and an information recording format, which correspond to digital information on one frame for normal display.

For example, the above video data are alternately arranged at the left and right in units of the footprint (ECC configuration and data recording format) for one normal frame with respect to recording video signals RSin and LSin and a recording audio signal ASin from the two left and right video cameras #1 and #2 shown in FIG. 1. This is because the video data DR and DL of left and right frames for three-dimensional display, the digital information being acquired by shooting an object 1 from the left and right at the same time, is recorded in the magnetic tape 80. In this recording, the digital information is recorded in the magnetic tape 80 at a speed that is two times as high as the speed of recording one frame for normal display. In the case where frame frequencies are equal to each other, a footprint is recorded at a speed that is two times as high as usual.

In FIG. 10, digital information of Lch of one frame is composed of video data of Lch of one frame and audio data. Similarly, digital information of Rch of one frame is composed of video data of Rch of one frame and audio data. Video data DL of Lch of one frame is composed of items of video data L-V0 and L-V1 of one field. The audio data Da is composed of items of audio data A0 and A1 of one field. Digital information of Rch of one frame is mapped (allocated) adjacent to this digital information of Lch of one frame. Video data DR of Rch of one frame is composed of items of video data R-V0 and R-V1 of one field. The audio data Da is composed of items of audio data A0 and A1 of one field. In any field, a cycle thereof is 1/60 seconds.

In this example, an upward edge of a CTL signal rises on a field-by-field basis. The duties thereof, 65%, 50%, 35%, and 50%, however, differ from each other depending on the left and right frames. These settings are merely provided as one example, and another combination may be used. In short, the left and right frames may be discriminated from each other on a duty-by-duty basis. For example, 65% is a duty of a CTL signal for specifying video data DL and audio data Da on a first field of one frame of the light channel Lch. Also, 50% is a duty of the CTL signal for specifying video data DL and audio data Da on a second field thereof. In addition, 35% is a duty of the CTL signal for specifying video data DR and audio data Da on a first field of one frame of Rch. Also, 50% is a duty of a CTL signal for specifying video data DR and audio data Da on the second field thereof.

Further, video data DL of Lch of one frame is composed of items of video data L-V2 and L-V3 of one field adjacent to the digital information of Rch of one frame. The audio data Da is composed of items of audio data A2 and A3 of one field. Additional digital information of Rch of one frame is mapped (allocated) adjacent to the digital information of Lch of one frame.

Video data DR of Rch of one frame is composed of items of video data R-V2 and R-V3 of one field. The audio data Da is composed of items of audio data A2 and A3 on one field. In any field, a cycle thereof is 1/60 seconds.

FIG. 11A shows a mapping example (30P) as a comparative example. According to this mapping example, digital information on one frame is composed of video data V0 of one field, video data V1 of one field, audio data A0 of one field, and audio data A1 of one field. Next one-frame digital information is mapped (allocated) adjacent to the digital information on this one frame. Video data Dv of the frame is composed of items of video data V2 and V3 of one field. The audio data Da is composed of items of audio data A2 and A3 of one field.

Next, one-frame digital information is further mapped (allocated) adjacent to the digital information on this one frame. Video data Dv on the frame is composed of items of video data V4 and V5 of one field. The audio data Da is composed of items of audio data A4 and A5 of one field. The subsequent data is configured similarly. In any field, a cycle thereof is 1/60 seconds.

In addition, an upward edge of a servo control signal (herein after, referred to as "CTL signal") shown in FIG. 11B is raised on a field-by-field basis. The duties thereof, 65%, 50%, 35%, and 50% differ from each other on a frame by frame basis. A duty of a CTL signal for specifying video data Dv and audio data Da on a first field of a first frame is 65%. A duty of the CTL signal for specifying video data Dv and audio data Da of a second field thereof is 50%. A duty of the CTL signal for specifying video data Dv and audio data Da on a first field of a second frame is 35%. A duty of the CTL signal for specifying video data Dv and audio data Da on the second field thereof is 50%.

On the presumption of these matters, an Rch recording video signal RSin input from the video camera #1 shown in FIG. 1 via the input terminal 120 for video R of FIG. 2 is compressed by a video compressor circuit 12. For example, in the video compressor circuit 12, the Rch recording video signal RSin is divided into two-dimensional blocks each having 8×8 pixels, and data compression processing is carried out using block encoding, such as DCT.

Further, Lch recording data signal LSin input from the video camera #2 via the input terminal 110 for video L of FIG. 2 is compressed by a video compressor circuit 11. For example, in the video compressor circuit 11, the Lch recording video signal LSin is divided into two-dimensional blocks each having 8×8 pixels, and data compression processing is carried out using block encoding, such as DCT.

Lch video data DL after compression by the video compressor circuit 11 and Rch video data DR after compression by a video compressor circuit 12 are multiplexed by a multiplexing circuit 20. Rch and Lch video data DR+DL after multiplexing are output to the recorder 4.

With recorder 4, digital information for three-dimensional display is recorded in a magnetic tape 80 with the digital information being alternately arranged in the left and right frames at a speed which is two times as high as the speed of recording digital information on one frame for normal display in units of an error correction configuration and an information recording format, which correspond to the digital information on one frame for normal display.

For example, in a parity-adding circuit 30, Rch and Lch video data (compression and encoding multiplexed data) DR+DL that have been multiplexed in the multiplexing circuit 20 and recording audio data Asin are input. For this compression and encoding multiplexed data DR+DL, error correction and encoding processing using a product code is then carried out in units of encoding, and error correction and encoding processing using a product code is carried out for a recording audio signal ASin.

Video data (error correction and encoding data) VDb output from this parity-adding circuit 30 is amplified by a recording circuit 40, and the error correction and encoding data VDb thus amplified is output to a helical recording head 50. The helical recording head 50 sequentially records the error correction and encoding data VDb in a recording track of a magnetic tape 80.

At this time, in the input write buffer 33 of the parity-adding circuit 30 shown in FIG. 3, video data (compression and encoding data) DR+DL supplied from the above-described multiplexing circuit 20 and the recording audio signal ASin are written into the SDRAM 31.

Then, from the video C2 readout buffer 34 connected to the SDRAM interface 32, video data DR+DL corresponding to 36 ECC blocks, which are read out from an SDRAM 31, supplied to the C2 encoder 35. At this time, video data corresponding to 36 ECC blocks are supplied in parallel from the C2 readout buffer 34 to the C2 encoder 35. In addition, in this case, video data on each of the ECC blocks is supplied in the order of data on sync-blocks 0 to 113.

In this C2 encoder 35, C2 parities (external code parities) in 36 ECC blocks are computed for each field. In this C2 encoder 35, C2 parities in 36 ECC blocks computed for each field are written in the SDRAM 31 by the C2 write buffer 36.

Further, the video data and C2 parities corresponding to 36 ECC blocks, which have been written into the SDRAM 31, are read out from the SDRAM 31 to the recording circuit 40 on a field-by-field basis through an output readout buffer 37 and the like.

On the other hand, the audio C2 readout buffer 310 reads out audio data Da corresponding to 24 ECC blocks from the SDRAM 31, and supplies the readout data to a C2 encoder 311. The C2 encoder 311 computes C2 parities (parities of external code) in 24 ECC blocks on a field-by-field basis. The audio data Da and C2 parities corresponding to 24 ECC blocks are output from an output readout buffer 312 to a SYNC/ID adding circuit 38 on a field-by-field basis.

This SYNC/ID adding circuit 38 adds sync data and an ID to a data string of video data (or C2 parity) on each sync-block, which is output from the output readout buffer 37 in the order of recording thereof. Similarly, it adds sync data and an ID to a data string of audio data (or C2 parity)

on each sync-block, which is also output from the output readout buffer 37 in the order of recording thereof.

A data string to which the sync data and the ID are added is output from the SYNC/ID adding circuit 38 to the C1 encoder 39. In the C1 encoder 39, a C1 parity is computed and is to be added to video data and audio data Da in each sync-block to which the sync data and the ID are added. Video data DR+DL and the audio data Da are multiplied and output as DVb from the C1 encoder 39 to the recorder circuit 40.

Together with this, the CTM generator 60 generates a CTL signal serving as a reference when an error correction and encoding data (digital information) for three-dimensional display is reproduced. The CTM generator 60 then modulates this CTL signal and outputs the modulated signal to a CTL recording head 70. For example, the CTL generator 60 modulates a waveform duty of the CTL signal according to the left and right frames of the error correction and encoding data VDb for three-dimensional display.

At this time, the CTL generator 60 raises an upward edge of a CTL signal on a field-by-field basis so that duties are set differently to 65%, 50%, 35%, or 50% in the left and right frames. This is because the left and right frames are discriminated from each other depending on a waveform duty.

For example, the CTL generator 60, as shown in FIG. 10, sets to 65% a duty of a CTL signal for specifying video data DL and audio data Da on a first field of one frame of the light channel Lch. A duty of the CTL signal for specifying video data DL and audio data Da on a second field thereof is set to 50%. In addition, a duty of the CTL signal for specifying video data DR and audio data Da on a first field of one frame of Rch is set to 35%. A duty of the CTL signal for specifying video data DR and audio data Da on a second field thereof is set to 50%.

In the CTL recording head 70, a CTL signal thus modulated to be at a different duty, such as 65%, 50%, 35%, and 50%, and output from the CTL generator 60 is recorded in the magnetic tape 80. In this manner, as shown in a mapping example (3D, 30P) of the video data DR+DL and audio data Da of FIG. 10, video data DR+DL for three-dimensional display is recorded with the data being alternately arranged in the left and right frames in units of an error correction configuration and an information recording format, which correspond to digital information on one frame for normal display. Moreover, the digital information on contiguous left and right frames for three-dimensional display is classified into digital information on a contiguous right frame or digital information on a contiguous left frame.

In addition, according to the magnetic tape 80 obtained by applying a mapping example (3D, 30P) of video data DR+DL and audio data Da, the video data DR and DL for three-dimensional display are recorded with the data being alternately arranged in the left and right frames. Therefore, the magnetic tape 80 can read out digital information on the contiguous right frame or digital information on the contiguous left frame from digital information on the contiguous left and right frames for three-dimensional display. In this manner, in a normal image reproducing system, which is not a three-dimension image and audio recording and reproducing system 10 as well, video data DR or DL is reproduced by dynamic tracking on a discrete one frame-by-frame basis, thereby making it possible to compatibly reproduce video data DR or DL and audio data Da on the continuous arbitrary left and right channels.

[Other Information-Recording Apparatus]

Figure 12:
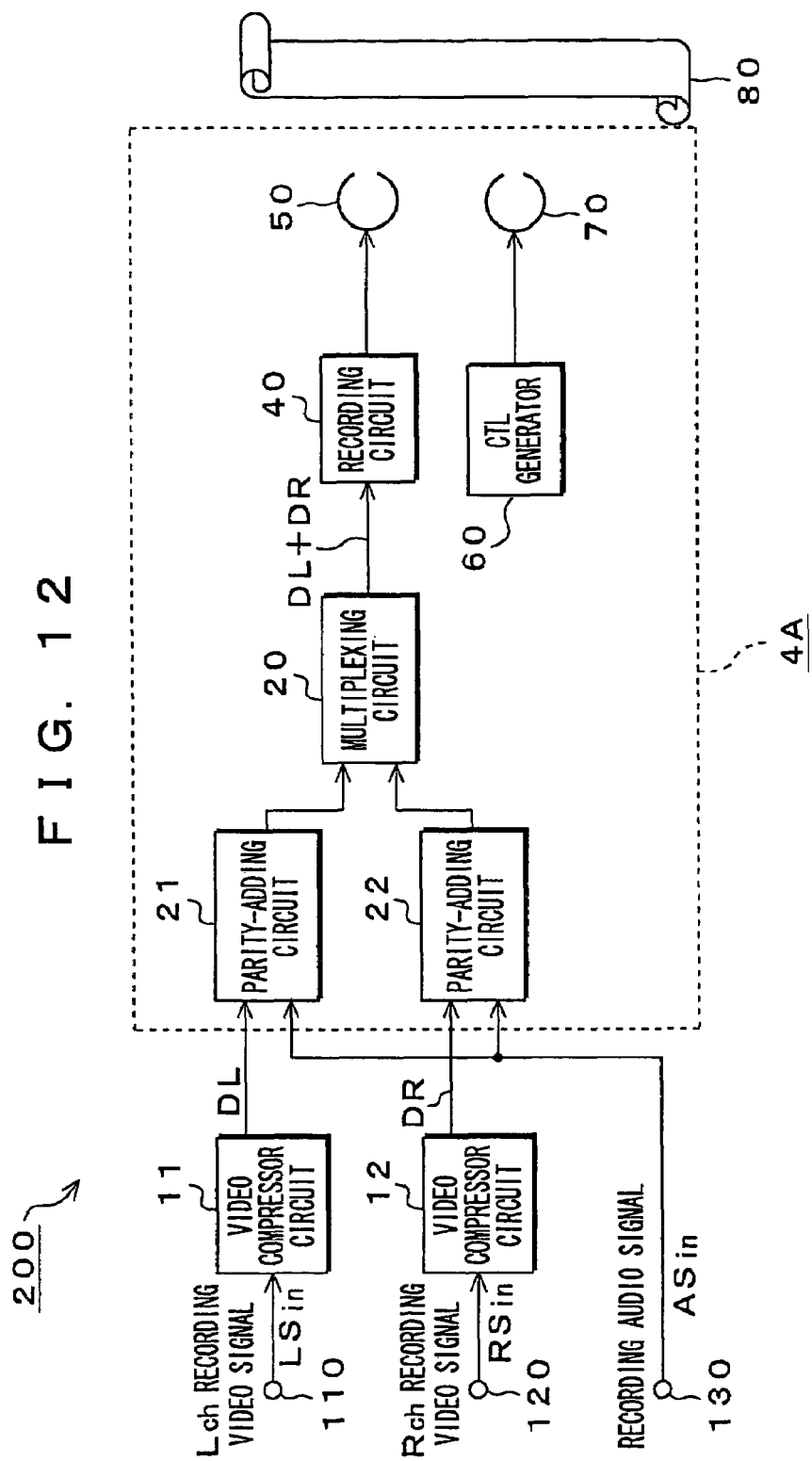
FIG. 12 is a view for showing a configuration of a recording system of VTR 200 according to a second embodiment of the present invention.

FIG. 12 shows a configuration of a recording system of VTR 200 according to a second embodiment of the present invention.

The recording system of VTR 200 shown in FIG. 12 has recorder 4A and video compressor circuits 11 and 12 and is provided as an example of carrying out multiplexing after addition of a parity. This recorder 4A has two parity-adding circuits 21 and 22, one multiplexing circuit 20, a recording circuit 40, a helical recording head 50, a CTL generator 60, and a CTL recording head 70. The same reference numerals and elements in the first embodiment have the same functions. Thus, a description thereof is omitted here. Two parity-adding circuits 21 and 22 each have a function identical to the parity-adding circuit 30 described in the first embodiment.

The parity-adding circuit 21 receives Lch video data (compression and encoding multiplexed data) DL after data compression from an input terminal 110 for video signal L and a recording audio signal ASin from an input terminal 130 for audio signal. With respect to this compression and encoding multiplexed data DL, error correction and encoding processing is carried out using a product code in units of encoding, and error correction and encoding processing is carried out using a product code for the recording audio signal ASin.

The parity-adding circuit 22 receives Rch video data (compression and encoding multiplex data) DR after data compression from an input terminal 120 for video signal R and a recording audio signal ASin from an audio signal input terminal 130. With respect to this compression and encoding multiplex data DR, error correction and encoding processing is carried out using a product code in units of encoding, and error correction and encoding processing is carried out using a product code for a recording audio signal ASin.

The multiplexing circuit 20 multiplexes Lch video data DL thus error-corrected and encoded by the parity-adding circuit 21 and Rch video data DR thus error-corrected and encoded by the parity-adding circuit 22. Rch and Lch video data DR+DL thus multiplexed are output to the recording circuit 40. Processing at the later stage from the recorder circuit 40 is carried out in the same manner as that in the first embodiment.

In this manner, with the VTR 200 and information recording method according to the second embodiment of the present invention, when digital information on left and right frames for three-dimensional display, the digital information being acquired by shooting an object 1 from the left and right at the same time, is recorded in the magnetic tape 80, the recorder 4A records the digital information for three-dimensional display with the digital information being alternately arranged in the left and right frames at a speed which is two times as high as the speed of recording digital information on one frame for normal display in units of an error correction configuration and an information recording format, which correspond to the digital information on one frame for the normal display.

Therefore, during information reproduction, digital information on the contiguous left and right frames for three-dimensional display is made compatible with digital information on a contiguous right frame or digital information on a contiguous left frame. In this manner, a general image display device without having an additional special image display function reproduces the digital information on the contiguous right or left frame for three-dimensional display. Moreover, error correction and encoding processing can be carried out in parallel by the recording system of VTR 200, as compared with that according to the first embodiment, and thus, high-speed data processing can be carried out.

[Information-Reproducing Apparatus]

Figure 13:
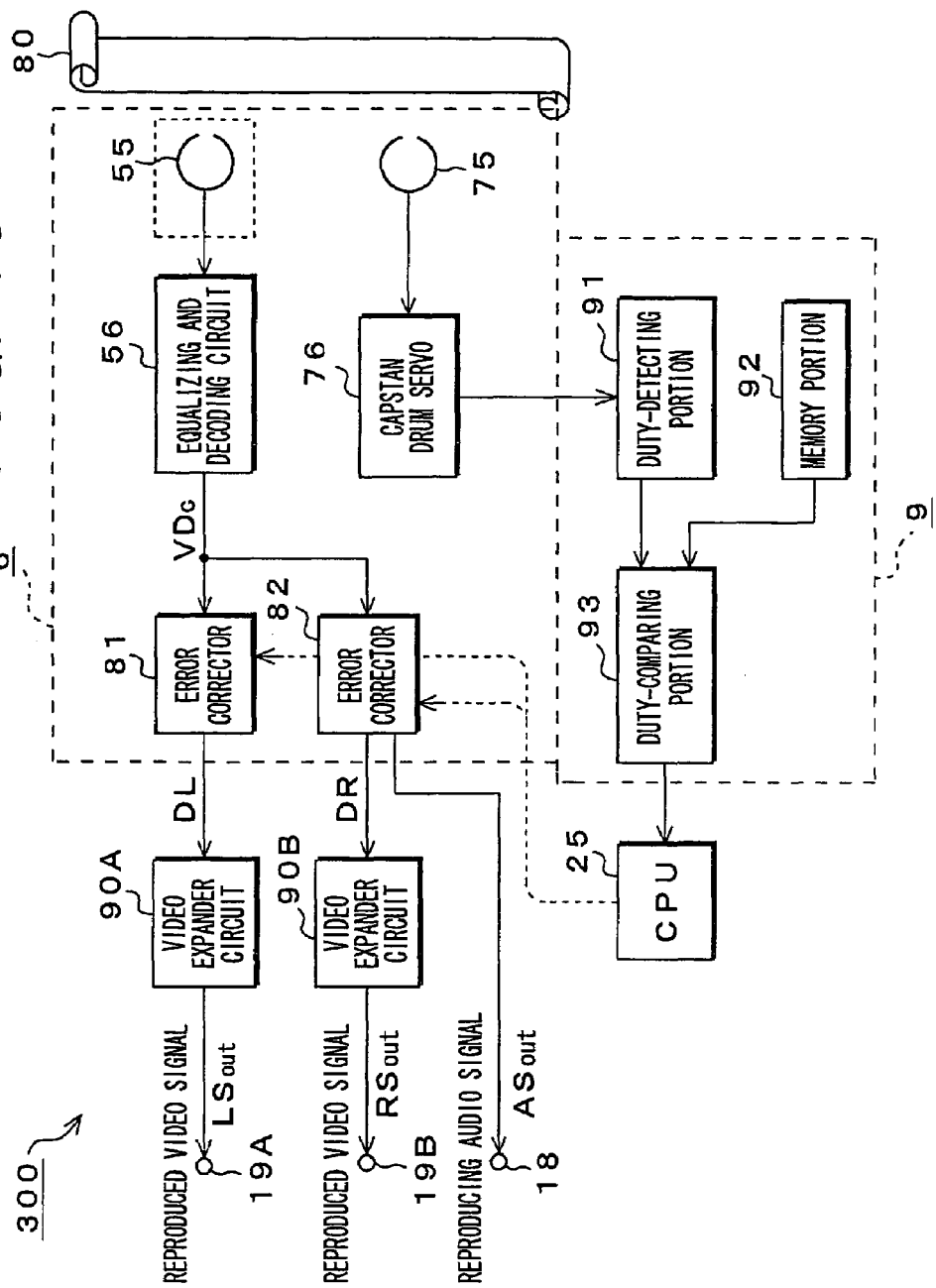
FIG. 13 is a view for showing a configuration of a reproducing system of VTR 300 according to a third embodiment of the present invention.

FIG. 13 shows a construction of a reproducing system of VTR 300 according to a third embodiment of the present invention.

In this embodiment, a three-dimension image data and audio data for three-dimensional display (3D) are reproduced in the VTR 100 at the same time. The VTR 300 shown in FIG. 13 is provided as one example of an information-reproducing apparatus. This VTR is provided as an apparatus for reproducing from a magnetic tape 80 digital information on the left and right frames for three-dimensional display, the digital information being acquired by shooting an object 1 from the left and right at the same time. The VTR 300 can be used in combination with the recording system of VTR 100 described in the first embodiment or the recording system of VTR 200 described in the second embodiment. Of course, the VTR 300 may be used as an apparatus for carrying out reproduction only.

This VTR 300 has a reproducer 6, an audio output terminal 18, video output terminals 19A, 19B, and video expander circuits 90A, 90B. The reproducer 6 reads the left and right frames alternately out of the magnetic tape 80 and reproduces digital information on left and right frames for three-dimensional display at a speed which is "n" times as high as the speed of reproducing digital information on one frame for normal display in units of an error correction configuration and an information recording format, which correspond to the digital information on one frame for normal display. In this example, a description will be given with respect to a case of n=2.

For example, the reproducer 6 has a helical reproducing head 55, an equalizing and decoding circuit 56, a CTL reproducing head 75, and error correctors 81, 82. The helical reproducing head 55 reads the video data VDc on the left and right frames for three-dimensional display from the recording track of the magnetic tape 80.

The equalizing and decoding circuit 56 is connected to the helical reproducing head 55. The equalizing and decoding circuit 56 is composed of a waveform-equalizing circuit and a decoding circuit, which are not shown. First, a reproducing amplifier amplifies the reproduced video data VDc on the left and right frames for three-dimensional display, which is reproduced from the recording track. Then, the reproduced video data VDc is waveform-equalized in the waveform equalizing circuit. Further, the decoding circuit performs decoding processing utilizing a Viterbi algorithm, for example, on the reproduced signal thus waveform-equalized. Then, reproduced video data VDc corresponding to the recording video data DVb output from the parity-adding circuit 30 of the above-described recording system is obtained.

Two error correctors 81 and 82 are connected to the equalizing and decoding circuit 56 and, for example, an ECC decoder is used therein. The error corrector 81 performs error correction on the reproduced video data VDc on the left frame for three-dimensional display output from the equalizing and decoding circuit 56. This error corrector 81 carries out error correction using a parity (C1 parity or C2 parity) added to the reproduced video data VDc on the left frame. The compression and encoding data thus error-corrected is provided as left video data DL.

Similarly, the error corrector 82 performs error correction on the reproduced video data VDc on the right frame for three-dimensional display output from the equalizing and decoding circuit 56. This error corrector 82 carries out error correction using a parity (C1 parity or C2 parity) added to the reproduced video data VDc on the right frame. The compression and encoding data thus error-corrected is provided as right video data DR.

A video expander circuit 90A is connected to the error corrector 81. Video data DL of the left channel (compression and encoding data) after error correction, the data being output from the error corrector 81, is subjected to data expansion in accordance with procedures reversed from those of the video compressor circuit 11 of the recording system. Then, this video expander circuit 90A supplies video data LSout to an output terminal 19A.

Similarly, a video expander circuit 90B is connected to the error corrector 82. Video data DR of the right channel (compression and encoding data) after error correction, the data being output from the error corrector 82, is subjected to data expansion in accordance with procedures reversed from those of the video compressor circuit 12 of the recording system. Then, the video expander circuit 90B supplies video data RSout output to an output terminal 19B.

On the other hand, the CTL reproducing head 75 reproduces a servo control signal (CTL signal) from a servo pilot of a recording track of the magnetic tape 80. A capstan drum servo 76 is connected to the CTL reproducing head 75 so that a capstan drum can be driven based on the CTL signal. In this example, the CTL signal is provided as a reference when video data VDc on the left and right frames for three-dimensional display is read out and reproduced from the magnetic tape 80.

Judgement apparatus 9 is connected to this capstan drum servo 76 and detects a waveform duty of a CTL signal to judge the recording format of the reproduced video data VDc on the left and right frames for three-dimensional display. The judgement apparatus 9 has, for example, a duty-detecting portion 91, a memory portion 92, and a duty-comparing portion 93. The memory portion 92 stores a predetermined reference waveform duty.

The duty-detecting portion 91 detects a waveform duty of a CTL signal output from the capstan drum servo 76. The duty-comparing portion 93 is connected to the duty-detecting portion 91 and the memory portion 92 and compares a waveform duty of the CTL signal detected by this duty-detecting portion 91 with a predetermined reference waveform duty to output information concerning the recording format of the reproduced video data VDc on the left and right frames for three-dimensional display.

For example, with respect to a waveform duty at an interval of high level (herein after, referred to as a level "H") of a CTL signal, in the case where 65%, 50%, 35%, or 50% is set, it is judged that there exists a recording format of the reproduced video data VDc on the left and right frames for three-dimensional display corresponding to a picture frame of 1920 pixels×1088 pixels. Alternatively, with respect to that waveform duty, in the case where 65%, 35%, 50%, or 35% is set, it is judged that there exists a recording format of reproduced video data VDc on the left and right frames for three-dimensional display corresponding to a picture frame of 2K pixels×1K pixels.

A CPU 25 serving as one example of control means is connected to this duty-comparing portion 93; a waveform rising edge of a CTL signal is detected; and a field cycle is judged. For example, in the case where a period of an UP edge of a CTL signal is N segments, the CPU 25 judges that there exists a format of N segment per field. The CPU 25 also judges that there exists a format of 2N segment per field in the case where a period of an UP edge of a CTL signal is 2N segments.

The CPU 25 controls the reproducer 6 based on this judgement result. For example, the CPU 25 controls the error correctors 81, 82 or the like so that they can detect a waveform duty of a CTL signal and reproduce the video data VDc on the right frame or the video data VDc on the left frame based on the waveform duty. Further, the CPU 25 subjects the reproducer 6 to dynamic tracking control so that the video data VDc can be reproduced on a discrete one frame-by-frame basis from the magnetic tape 80. This allows the reproduced video data VDc on the contiguous left and right frames for three-dimensional display to be made compatible with video data DR on a contiguous right frame or video data DL on a contiguous left frame.

Figure 14:
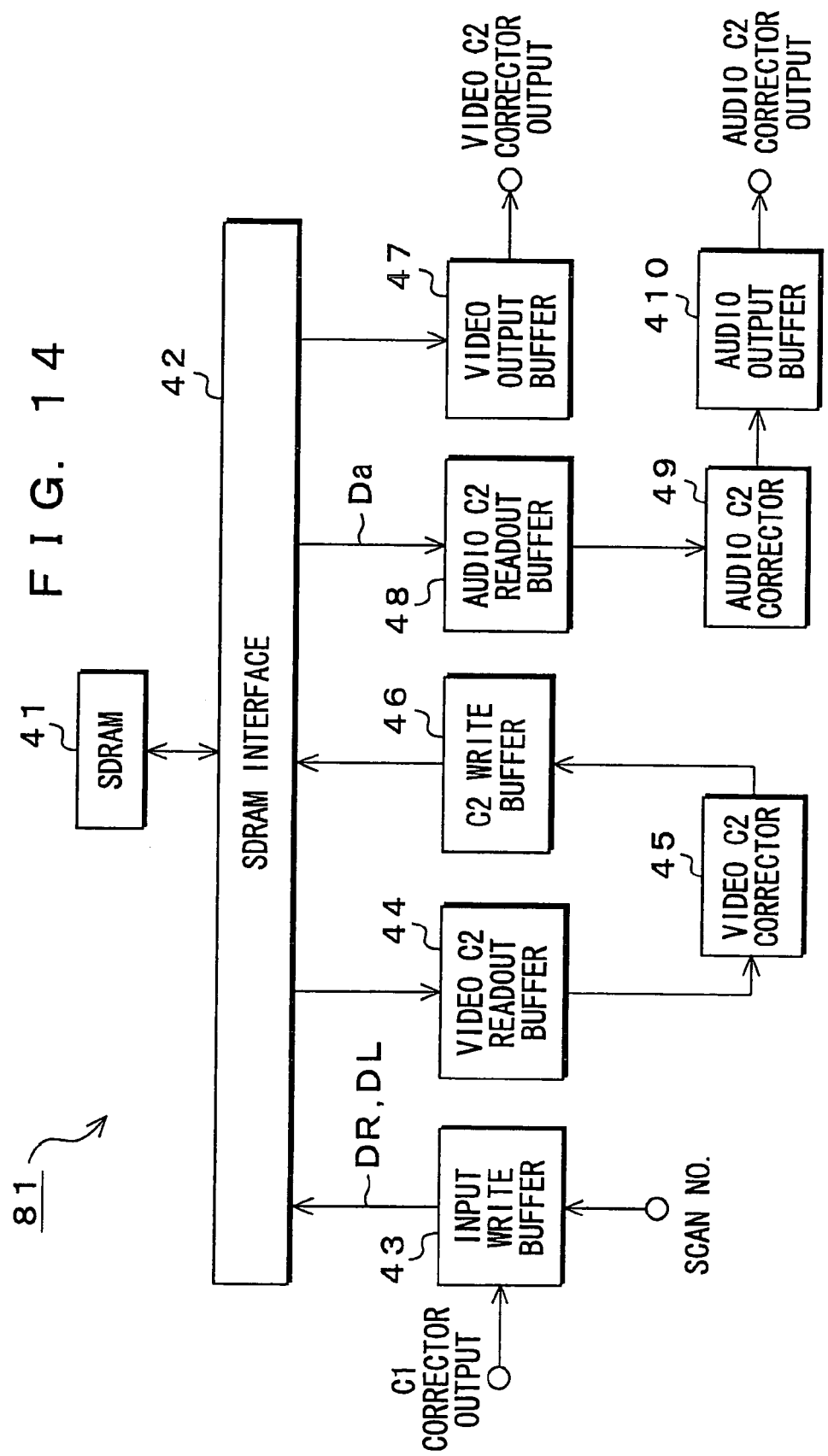

FIG. 14 is a block diagram for depicting an internal configuration according to an error corrector 81 or the like. The error corrector 81 shown in FIG. 14 has an SDRAM 41 and an SDRAM interface 42 serving as an interface for carrying out writing and reading the data into and from this SDRAM 41.

The SDRAM 41 has a capacity capable of storing video data DR+DL on multiple fields. In this case, the SDRAM 41 has memory spaces corresponding to 36 ECC blocks (refer to FIG. 7A) for each of the fields of Rch and Lch.

An input write buffer 43 is connected to this SDRAM interface 42 and is used as a buffer for writing into the SDRAM 41 the video data (compression and encoding data) DR+DL received from a C1 corrector circuit (not shown) and the reproduced audio data. A video C2 readout buffer 44 is connected to the SDRAM interface 42 and is used as a buffer for supplying to a video C2 corrector 45 (described later) the video data DR+DL, which corresponds to 36 ECC blocks, read out of the SDRAM 41.

The C2 corrector 45 is connected to this C2 readout buffer 44 and computes C2 parities (parities for external code) in 36 ECC blocks with respect to each field. The C2 corrector 45 has 36 computers for computing C2 parities and is provided so as to compute C2 parities in the above-described 36 ECC blocks in parallel to each other. Thus, the video data corresponding to 36 ECC blocks are supplied in parallel to each other from the C2 readout buffer 44 to the C2 corrector 45. In this case, the video data in each ECC block is supplied in order of sync-block data of 0 to 113.

In addition, a C2 write buffer 46 is connected to the C2 corrector 45 and is used as a buffer for writing in the SDRAM 41 the C2 parities in 36 ECC blocks computed by the C2 corrector 45 with respect to each field. Further, a video output buffer 47 is connected to the SDRAM interface 42 and is used as a buffer for outputting the video data and C2 parities corresponding to 36 ECC blocks read out from the SDRAM 41 with respect to each field.

An audio C2 readout buffer 48 is connected to the above-described SDRAM interface 42 and is used as a buffer for outputting the audio data Da and C2 parities corresponding to 24 ECC blocks read out from the SDRAM 41 with respect to each field. In addition, an audio C2 corrector 49 is connected to the audio C2 readout buffer 48 and is provided so as to compute C2 parities (external code parities) in 24 ECC blocks. An audio output buffer 410 is connected to the C2 corrector 49 and is used as a buffer for outputting the audio data Da and C2 parities corresponding to 24 ECC blocks with respect to each field.

Now, operations in a VTR 300 will be described here. In this embodiment, it is presumed that digital information on the left and right frames for three-dimensional display, the digital information being acquired by shooting an object 1 from the left and right at the same time, is reproduced from a magnetic tape 80.

In the CTR 300 shown in FIG. 13, the left and right frames are alternately read out of the magnetic tape 80 at a speed which is two times as high as the speed of reproducing digital information on one frame for the normal display in units of an error correction configuration and an information recording format, which correspond to the digital information on one frame for normal display, and the left and right video data and an audio signal for three-dimensional display are then reproduced. In this example, when a video data for three-dimensional display is reproduced from the magnetic tape 80, a CTL signal serves as a reference of the video data is reproduced. A waveform duty of the CTL signal thus reproduced is detected so that the recording format of the video data can be judged.

On the presumption of these matters, as shown in FIG. 13, the helical reproducing head 55 reads and reproduces the video data on the left and right frames for three-dimensional display out of a recording track of the magnetic tape 80. The reproduced video data VDc on the left and right frames is output from the helical reproducing head 55 to the equalizing and decoding circuit 56. The equalizing and decoding circuit 56 equalizes a waveform after there has been amplified the reproduced video data VDc, which is output from the helical reproducing head 55, on the left and right frames for three-dimensional display. Further, a reproduced signal after waveform equalizing is subjected to decoding processing utilizing a Viterbi algorithm, for example. As a result of this processing, there is obtained the reproduced video data VDc corresponding to the recording video data VDb output from the parity-adding circuit 30 of the above-described recording system.

This reproduced video data VDc is output from the equalizing and decoding circuit 56 to two error correctors 81 and 82. The error corrector 81 carries out error correction of the reproduced video data VDc, which is output from the equalizer and decoder circuit 56, on the left frame for three-dimensional display. This error corrector 81 carries out error correction using parities (C1 parity and C2 parity) added to the video data VDc on the left frame. The compression and encoding data after error correction is provided as video data DL of left channel.

Similarly, the error corrector 82 carries out error correction of the audio data Da output from the equalizing and decoding circuit 56 and the reproduced video data VDc on the right frame for three-dimensional display. This error corrector 82 carries out error correction using parities (C1 parity and C2 parity) added to the reproduced video data VDc on the right frame. The compression and encoding data after error correction is provided as video data DR of right channel and audio data Da.

The video data DL of left channel is output from the error corrector 81 to the video expander circuit 90A. The video expander circuit 90A carries out data expansion of the video data (compression and encoding data) DL of left channel after error correction, the video data being output from this error corrector 81, in accordance with procedures reversed from those of the video compressor circuit 11 of the recording system. Then, the video data LSout output from this video expander circuit 90A is output to an output terminal 19A.

In addition, the video data DR of right channel is output from the error corrector 82 to the video expander circuit 90B. The video expander circuit 90B carries out data expansion of the video data (compression and encoding data) DR of right channel after error correction, the video data being output from the error corrector 82, in accordance with procedures reversed from those of the video compressor circuit 12 of the recording system. Then, video data RSout output from the video expander circuit 90B is output to the output terminal 19B. Audio data Da, after error correction, is provided as a reproduced audio signal ASout, and is output to the output terminal 18.

On the other hand, the CTL reproducing head 75 reproduces a servo control signal (CTL signal) from a servo pilot of a recording track of the magnetic tape 80. This CTL signal is output from the CTL reproducing head 75 to a capstan drum servo 76. The capstan drum servo 76 drives a capstan drum based on a CTL signal. In this example, the CTL signal is provided as a reference when the reproduced video data VDc on the left and right frames for three-dimensional display is reproduced from the magnetic tape 80. The CTL signal is output from the capstan drum servo 76 to the judgement apparatus 9.

At this time, the duty-detecting portion 91 of the judgement apparatus 9 detects a waveform duty of the CTL signal output from the capstan drum servo 76. The duty-comparing portion 93 compares a waveform duty of the CTL signal detected by the duty-detecting portion 91 with a reference waveform duty read out of the memory portion 92 and outputs the information concerning a recording format of the reproduced video data VDc of the left and right frames for three-dimensional display. This enable the recording format of the reproduced video data VDc on the left and right frames for three-dimensional display to be judged based on the waveform duty detection of the CTL signal.

For example, with respect to a waveform duty of an interval of level "H" of the CTL signal, in the case where 65%, 50%, 35%, or 50% is set, it is judged that there exists a recording format of the reproduced video data VDc on the left and right frames for three-dimensional display which corresponds to a picture frame having 1920 pixels×1988 pixels. Alternatively, with respect to that waveform duty, in the case where 65%, 35%, 50%, or 35% is set, it is judged that there exists a recording format of the reproduced video data VDc on the left and right frames for three-dimensional display which corresponds to a picture frame having 2048 pixels×1024 pixels.

Information concerning this recording format is output from the duty-comparing portion 93 to the CPU 25. The waveform rising edge of the CTL signal is then detected. CPU 25 judges a field cycle. For example, when a period of an UP edge of a CTL signal is N segments, the CPU 25 judges that there exists a format of N segment per field. Further, when a period of an UP edge of a CTL signal is 2N segments, the CPU 25 judges that there exists a format of 2N segments per field.

In this manner, with the VTR 300 and information-reproducing method according to a third embodiment of the present invention, based on a format judgement result, the CPU 25 controls the error correctors 81, 82 so as to detect a waveform duty of the CTL signal and reproduce the video data VDc on the right frame or reproduce the video data VDc on the left frame based on the waveform duty. Further, the CPU 25 subjects the reproducer 6 to dynamic tracking control to reproduce the video data VDc on a discrete one frame-by-frame basis from the magnetic tape 80.

This allows the contiguous video data DR or DL of the left or right channel and audio data Da to be compatibly reproduced in a general image and audio reproducing system, which is not a three-dimension image and audio recording and reproducing system 10 as well.

[Other Information-Reproducing Apparatus]

Figure 15:
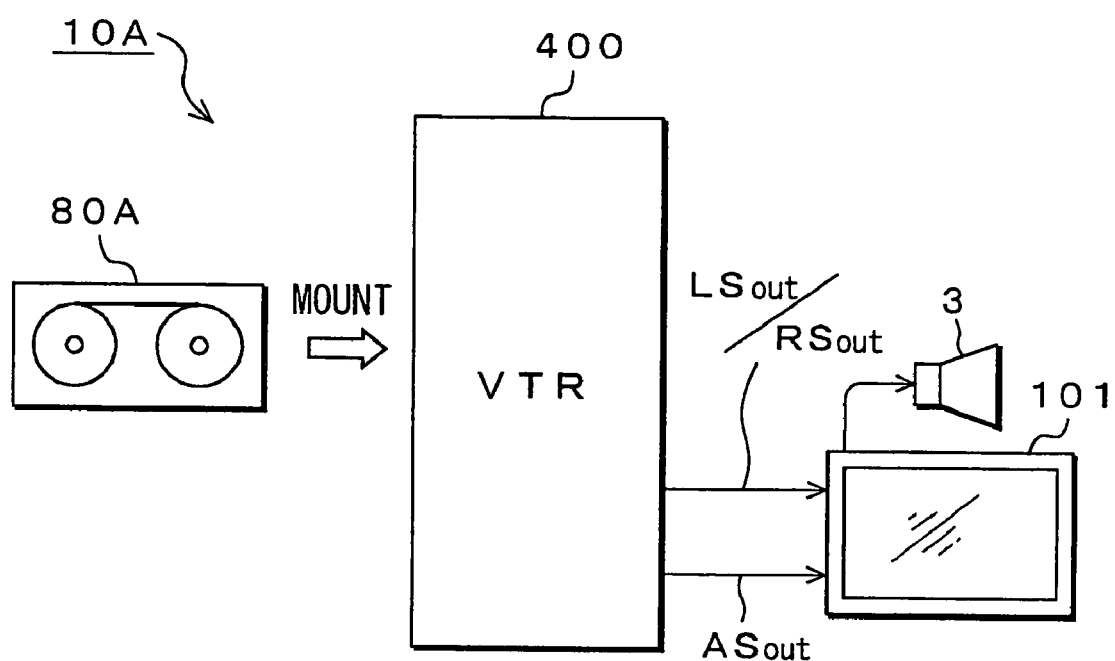
FIG. 15 is a conceptual view for showing a configuration of another video and audio reproducing system 10A obtained by applying an information-reproducing apparatus according to an embodiment of the present invention.

FIG. 15 is a conceptual view for showing a configuration of an image and audio reproducing system 10A obtained by applying an information-reproducing apparatus according to another embodiment of the present invention.

In this embodiment, a general image and audio reproducing system 10A, which is not a three-dimension image and audio recording and reproducing system, comprises a VTR 400 for reproducing contiguous video data DR or DL on a arbitrary left or right channel (frame) and audio data Da.

A magnetic tape 80A having a three-dimensional image and audio recording format that has recorded therein contiguous video data DR or DL on an arbitrary left or right channel and audio data Da is applied to the CTR 400 in the image and audio reproducing system 10A, as shown in FIG. 15, serving as one example of a recording and reproducing apparatus. A cassette having the magnetic tape 80A wound around its reel is mounted on the CTR 400. This magnetic tape 80A is recorded with the VTR 100 according to the first embodiment, the VTR 200 according to the second embodiment or the like.

A television monitor 101 in a general NTSC system or the like is connected to this VTR 400. The VTR 400 is provided so as to reproduce contiguous video data DR or DL of an arbitrary left or right channel and audio data Da from the magnetic tape 80A. The television monitor 101 displays a contiguous image of the left or right channel reproduced by the VTR 400 and outputs its voice or the like.

FIG. 16 shows a configuration of a reproducing system of VTR 400. In a case where this VTR 400 carries out reproduction of either the right or left channel of the three-dimension image and audio recording data, the VTR comprises a reproducer 6A, a judgment apparatus 9, a CPU 25, and a video expander circuit 90. In this example, the reproducer 6A has a helical reproducing head 55, an equalizing and decoding circuit 56, a CTL reproducing head 75, a DT (Dynamic Tracking) driver 77 for adjusting the heat height, and an error corrector 81. The same reference numerals and elements in the third embodiment have the same functions. A description of these elements is omitted here. The video expander circuit 90 has the same function as that of the video expander circuits 90A or 90B described in the second embodiment.

In this example, the DT (Dynamic Tracking) driver 77 is mounted on the helical reproducing head 55. For example, if only the left channel is contiguously reproduced compatibly, the helical reproducing head 55 drives vertically so as to trace only a recording region portion of the video data DL of the left channel. In addition, if the right channel is contiguously reproduced compatibly, the helical reproducing head 55 drives vertically so as to trace only a recording region portion of the video data DR of the right channel.

In this example as well, the judgement apparatus 9 is provided so as to detect a waveform duty of the CTL signal, and the CPU 25 is provided so as to reproduce video data DR on the right channel or video data DL on the left channel based on the waveform duty. For example, the reproducer 6A reproduces a CTL signal serving as a reference when reproducing digital information for three-dimensional display from the magnetic tape 80A, and the judgement apparatus 9 detects the waveform duty of this CTL signal and judges the recording format of digital information. In addition, the CPU 25 controls the reproducer 6A to detect the waveform duty of a CTL signal and reproduce digital information on the right frame or digital information on the left frame based on the waveform duty.

Now, operations in the VTR 400 will be described. This embodiment presumes a case in which video data DR or DL having a three-dimension recording and reproducing format and audio data Da are reproduced in a general image and audio reproducing system 10A, which is not a three-dimension image and audio recording and reproducing system.

The VTR 400 shown in FIG. 16 reads only the left or right frame out of the magnetic tape 80 at a speed (n=2) which is two times as high as the speed of reproducing digital information on one frame for normal display in units of an error correction configuration and an information recording format, which correspond to the digital information on one frame for normal display, to obtain the video data of the left or right channel for normal display and an audio signal. In this example as well, when video data on the left or right frame for three-dimensional display is reproduced from the magnetic tape 80, a CTL signal is reproduced as a reference of this video data. A wave form duty of the CTL signal thus reproduced is detected so that a recording format of the video data can be judged.

On the presumption of these matters, in the helical reproducing head 55 shown in FIG. 16, a reproducing position is controlled by means of the DT driver 77 so that the video data VDc of the left or right frame for three-dimensional display can be reproduced from a recording track of the magnetic tape 80A. For example, in a running direction of the magnetic tape 80A, the height of the helical reproducing head 55 is adjusted by means of the DT driver 77, and a trace position is controlled so as to draw an arc on that recording track.

The reproduced video data VDc on only the left frame is output from the helical reproducing head 55 to the equalizing and decoding circuit 56. The equalizing and decoding circuit 56 equalizes a waveform after the reproduced video data VDc of left frame output from the helical reproducing head 55 have been amplified. Further, decoding processing utilizing a Viterbi algorithm, for example, is applied to the reproduced signal thus waveform-equalized. As a result of this processing, there is obtained the reproduced video data VDc corresponding to recording video data VDb output from the parity-adding circuit 30 of the above-described recording system.

This reproduced video data VDc is output from the equalizing and decoding circuit 56 to the error corrector 81. The error corrector 81 carries out error correction of the reproduced video data VDc on only the left frame, which is output from the equalizing and decoding circuit 56. This error corrector 81 carries out the error correction using parities (C1 parity and C2 parity) added to the video data VDc on only the left frame. The compression and encoding data after error correction are provided as video data DL of left channel and audio data Da.

The video data DL of the left channel is output from the error corrector 81 to the video expander circuit 90. The video expander circuit 90 carries out data expansion of the video data (compression and encoding data) DL of the left channel after error correction, which is output from the error corrector 81, in accordance with procedures reversed from those of the video compressor circuit 11 of the recording system. A reproduced video signal LSout is output from this video expander circuit 90 to the output terminal 19. A video input of a general image display device, which does not have an additional three-dimension image and audio reproducing function, is connected to this output terminal 19. Audio data Da after error correction is provided as a reproduced audio signal ASout and is output to the output terminal 18. An audio input of a general image display device is connected to the output terminal 18.

On the other hand, the CTL reproducing head 75 reproduces a servo control signal (CTL signal) from a servo pilot of a recording track of the magnetic tape 80A. This CTL signal is output from the CTL reproducing head 75 to a capstan drum servo 76. The capstan drum servo 76 is provided so as to drive a capstan drum based on the CTL signal. In this example, the CTL signal is provided as a reference when reproducing the video data VDc on the left and right frames for three-dimensional display from the magnetic tape 80A. The CTL signal is output from the capstan drum servo 76 to the judgement apparatus 9.

At this time, a duty-detecting portion 91 of the judgement apparatus 9 detects a waveform duty of a CTL signal output from the capstan drum servo 76. A duty-comparing portion 93 compares a waveform duty of the CTL signal detected by the duty-detecting portion 91 with a reference waveform duty readout of a memory portion 92. In addition, this comparing portion outputs information concerning the recording format of the reproduced video data VDc on the left and right frames for three-dimensional display. In this manner, the recording format of the reproduced video data VDc on the left and right frames for three-dimensional display is judged based on waveform duty detection of the CTL signal.

The information concerning this recording format is output from the duty-comparing portion 93 to the CPU 25. The CPU 25 controls the error corrector 81 so as to detect a waveform duty of a CTL signal, and, based on the waveform duty, reproduces the video data VDc on the right frame or reproduces the video data VDc on the left frame.

In this manner, with the VTR 400 and the information-reproducing method according to the fourth embodiment of the present invention, the reproducer 6A is subjected to dynamic tracking control so as to reproduce the video data VDc on a discrete one frame-by-frame basis by the magnetic tape 80A.

This allows the video data DL+DR on contiguous left and right frames for three-dimensional display to be made compatible with video data DR on a contiguous right frame or video data DL on a contiguous left frame. In this manner, in a general image and audio reproducing system, which is not a three-dimension recording and reproducing system 10 as well, this allows the contiguous video data DR or DL of the left or right channel and audio data Da to be reproduced.

Each of the embodiments has described a case of n=2 with respect to a speed which is "n" times as high as the speed of recording digital information on one frame for normal display. The tern, "n" may be 3, 4, . . . without being limited thereto. In addition, the VTR 100 to VTR 400 have been described separately for an information-recording system and an information-reproducing system. With being limited thereto, of course, there may be configured: a video recording and reproducing apparatus using a combination of VTR 100 and VTR 300; a video recording and reproducing apparatus using a combination of VTR 100 and VTR 400; a video recording and reproducing apparatus using a combination of VTR 200 and VTR 300; or a video recording or reproducing apparatus using a combination of VTR 200 and VTR 400. The VTR 100 and VTR 200 may be utilized independently as a device for carrying out only information recording or the VTR 300 or VTR 300 may be utilized independently as a device for carrying out only information reproduction.

Additional advantages and modifications will readily occur to those skilled in the art. Therefore, the invention in its broader aspect is not limited to the specific details and representative embodiments shown and described herein. Accordingly, various modifications may be made without departing from the spirit or scope of the general inventive concept as defined by the appended claims and their equivalents.

What is claimed is:

1. An information-recording apparatus for recording in an information-recording medium digital information on left and right frames for three-dimensional display, the digital information being acquired by shooting an object from the left and right at the same time, said apparatus comprising
   a recorder for recording in the information recording medium said digital information for three-dimensional display with said digital information being alternately arranged at the left and right frames at a speed which is "n" times as high as the speed for recording digital information on one frame for normal display in units of an error correction configuration and an information recording format, which correspond to the digital information on one frame for the normal display
   wherein said recorder modulates a servo control signal serving as a reference when said digital information for three-dimensional display is reproduced and records the modulated signal in said information recording medium.

2. The information-recording apparatus as claimed in claim 1, wherein said recorder modulates a waveform duty of said servo control signal according to the left and right frames of said digital information for three-dimensional display.

3. An information-recording method for recording in an information recording medium a digital information on left and right frames for three-dimensional display, the digital information being acquired by shooting an object from the left and right at the same time, said recording method comprising the step of
   recording in the information-recording medium said digital information for three-dimensional display with said digital information being alternately arranged at the left and right frames at a speed which is "n" times as high as the speed for recording digital information on one frame for normal display in units of an error correction configuration and an information recording format, which correspond to the digital information on one frame for the normal display
   wherein a servo control signal serving as a reference during reproduction of said digital information for three-dimensional display is modulated, and the modulated signal is recorded in said information-recording medium.

4. The information-recording method as claimed in claim 3, wherein a waveform duty of said servo control signal is modulated according to the left and right frames of said digital information for three-dimensional display.

5. An information-reproducing apparatus for reproducing from an information-recording medium, digital information on left and right frames for three-dimensional display, the digital information being acquired by shooting an object from the left and right at the same time, said apparatus comprising
   a reproducer for reproducing digital information on left and right frames for three-dimensional display by reading the digital information on left and right frames alternately out of said information-recording medium at a speed which is "n" times as high as a speed of reproducing digital information on one frame for normal display in units of an error correction configuration and an information recording format, which correspond to the digital information on one frame for the normal display,
   wherein said reproducer reproduces a servo control signal serving as a reference when digital information for three-dimensional display is reproduced out of said information-recording medium.

6. The information-reproducing apparatus as claimed in claim 5, wherein said reproducer comprises judgment apparatus for detecting a waveform duty of the servo control signal reproduced by said reproduce, thereby judging a recording format of said digital information.

7. The information-reproducing apparatus as claimed in claim 5, wherein said apparatus further comprises a controller for detecting a waveform duty of said servo control signal and controlling said reproducer to reproduce the digital information on the right frame or the digital information on the left frame based on the waveform duty.

8. The information-reproducing apparatus as claimed in claim 7, wherein said controller executes dynamic tracking control for said reproducer to reproduce said digital information from said information-recording medium on a discrete one frame-by-frame basis.

9. An information-reproducing method for reproducing from an information recording medium digital information on left and right frames for three-dimensional display, the digital information being acquired by shooting an object from the left and right at the same time, said method comprising the step of
   reproducing digital information on left and right frames for three-dimensional display by reading the digital information on the left and right frames alternately out of said information recording medium at a speed which is "n" times as high as the speed of reproducing digital information on one frame for normal display in units of an error correction configuration and an information recording format, which correspond to the digital information on one frame for the normal display;
   wherein a servo control signal is reproduced serving as a reference when digital information for three-dimensional display is reproduced from said information-recording medium.

10. The information-reproducing method as claimed in claim 9, wherein a waveform duty of said reproduced servo control signal is detected to judge a recording format of said digital information.

11. The information-reproducing method as claimed in claim 9, wherein a waveform duty of said servo control signal is detected, and the digital information on the right frame or the digital information on the left frame is reproduced based on the waveform duty.

12. The information-reproducing method as claimed in claim 9, wherein dynamic tracking control is executed to reproduce said digital information from said information-recording medium on a discrete one frame-by-frame basis.

13. A computer-readable medium tangibly embodying computer-executable instructions, the instructions comprising instructions to:
   record digital information on left and right frames, on the same or another computer-readable medium, for three-dimensional display;

acquire the digital information by shooting an object from the left and right at the same time;

wherein said digital information for three-dimensional display is recorded with said digital information being alternately arranged in the left and right frames at a speed which is "n" times as high as the speed of recording digital information on one frame for normal display in units of an error correction configuration and an information recording format, which correspond to the digital information on one frame for the normal display; and reproducing a servo control signal which serves as a reference when digital information for three-dimensional display is reproduced from said information-recording medium.

* * * * *